(12) United States Patent
De Waal et al.

(10) Patent No.: US 10,515,507 B2
(45) Date of Patent: *Dec. 24, 2019

(54) GAMING SYSTEM, GAMING DEVICE AND METHOD PROVIDING A FIRST GAME AND A PLURALITY SECOND WAGERING GAMES EACH ASSOCIATED WITH A SEPARATE ACTIVATABLE COMPONENT OF THE FIRST GAME

(71) Applicant: IGT, Las Vegas, NV (US)

(72) Inventors: Daniel J. De Waal, Las Vegas, NV (US); Cameron A. Filipour, Las Vegas, NV (US); Anthony J. Baerlocher, Henderson, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,240

(22) Filed: May 9, 2018

(65) Prior Publication Data

US 2018/0261038 A1 Sep. 13, 2018

Related U.S. Application Data

(63) Continuation of application No. 14/852,027, filed on Sep. 11, 2015, now Pat. No. 9,978,201, which is a
(Continued)

(51) Int. Cl.
*A63F 9/24* (2006.01)
*A63F 13/00* (2014.01)
(Continued)

(52) U.S. Cl.
CPC .............. *G07F 17/32* (2013.01); *A63F 7/02* (2013.01); *G07F 17/3213* (2013.01);
(Continued)

(58) Field of Classification Search
CPC ..... A63F 7/02; G07F 17/3267; G07F 17/3297
See application file for complete search history.

(56) References Cited

U.S. PATENT DOCUMENTS 3,853,324 A 12/1974 Reiner et al.
3,877,700 A 4/1975 Moe
(Continued)

FOREIGN PATENT DOCUMENTS

JP 2007-054109 A 3/2007

OTHER PUBLICATIONS

Third Party Submission in Published Application Under 37 C.F.R. 1.99 filed for U.S. Appl. No. 12/768,380, dated Dec. 27, 2011 (3 pages).
(Continued)

*Primary Examiner* — Milap Shah
*Assistant Examiner* — Jason Pinheiro
(74) *Attorney, Agent, or Firm* — Neal, Gerber & Eisenberg LLP

(57) ABSTRACT

A gaming system having a first skill, partial skill, or pseudo skill based game having a plurality of individually activatable designated components and a plurality of second chance based games each respectively associated with a different one of the individually activatable components of the skill based game. When each designated component of the first game is activated through one or player inputs, a corresponding chance based game associated with that designated component is activated. Each chance based game randomly determines whether the player wins an award. In one embodiment, the likelihood of activating each designated component is different and the chance based game associated with each different designated component is different.

19 Claims, 16 Drawing Sheets

Related U.S. Application Data continuation of application No. 14/643,895, filed on Mar. 10, 2015, now Pat. No. 9,159,202, which is a continuation of application No. 13/779,065, filed on Feb. 27, 2013, now Pat. No. 8,992,297, which is a continuation of application No. 12/768,350, filed on Apr. 27, 2010, now Pat. No. 8,398,475.

(51) Int. Cl.
| | | |
|---|---|---|
| *G06F 17/00* | (2019.01) | |
| *G06F 19/00* | (2018.01) | |
| *G07F 17/32* | (2006.01) | |
| *A63F 7/02* | (2006.01) | |
| *G07F 17/34* | (2006.01) | |
| *A63F 13/44* | (2014.01) | |

(52) U.S. Cl.
CPC ...... *G07F 17/3248* (2013.01); *G07F 17/3251* (2013.01); *G07F 17/3262* (2013.01); *G07F 17/3267* (2013.01); *G07F 17/3286* (2013.01); *G07F 17/3297* (2013.01); *G07F 17/34* (2013.01); *A63F 13/44* (2014.09)

(56) References Cited

U.S. PATENT DOCUMENTS

| | | |
|---|---|---|
| 3,923,305 A | 12/1975 | Reiner et al. |
| 4,012,046 A | 3/1977 | Liket |
| 4,129,304 A | 12/1978 | Mager |
| 4,198,052 A | 4/1980 | Gauselmann |
| 4,363,485 A | 12/1982 | Edwall |
| 4,448,419 A | 5/1984 | Telnaes |
| 4,550,916 A | 11/1985 | Oritz |
| 4,582,324 A | 4/1986 | Koza et al. |
| 4,586,707 A | 5/1986 | McNeight et al. |
| 4,593,904 A | 6/1986 | Graves |
| 4,615,527 A | 10/1986 | Moss |
| 4,618,150 A | 10/1986 | Kimura |
| 4,624,459 A | 11/1986 | Kaufman |
| 4,652,998 A | 3/1987 | Koza et al. |
| 4,666,160 A | 5/1987 | Hamilton |
| 4,695,053 A | 9/1987 | Vazquez, Jr. et al. |
| 4,756,532 A | 7/1988 | Kamille |
| 4,773,647 A | 9/1988 | Okada et al. |
| 4,781,377 A | 11/1988 | McVean et al. |
| 4,805,907 A | 2/1989 | Hagiwara |
| 4,836,546 A | 6/1989 | DiRe et al. |
| 4,926,327 A | 5/1990 | Sidley |
| 4,936,588 A | 6/1990 | Rader et al. |
| 4,948,133 A | 8/1990 | Helm et al. |
| 4,964,642 A | 10/1990 | Kamille |
| 5,001,632 A | 3/1991 | Hall-Tipping |
| 5,083,271 A | 1/1992 | Thacher et al. |
| 5,083,800 A | 1/1992 | Lockton |
| 5,114,155 A | 5/1992 | Tillery et al. |
| 5,116,055 A | 5/1992 | Tracy |
| 5,205,555 A | 4/1993 | Humano |
| 5,280,909 A | 1/1994 | Tracy |
| 5,299,810 A | 4/1994 | Pierce et al. |
| 5,308,065 A | 5/1994 | Bridgeman et al. |
| 5,340,317 A | 8/1994 | Freeman |
| 5,342,047 A | 8/1994 | Heidel et al. |
| 5,342,049 A | 8/1994 | Wichinsky et al. |
| 5,342,058 A | 8/1994 | Giovannetti |
| 5,344,144 A | 9/1994 | Cannon |
| 5,393,061 A | 2/1995 | Manship et al. |
| 5,397,125 A | 3/1995 | Adams |
| 5,409,225 A | 4/1995 | Kelly et al. |
| 5,411,268 A | 5/1995 | Nelson et al. |
| 5,411,271 A | 5/1995 | Mirando |
| 5,429,361 A | 7/1995 | Raven et al. |
| 5,449,173 A | 9/1995 | Thomas et al. |
| 5,531,440 A | 7/1996 | Babrowski et al. |
| 5,536,016 A | 7/1996 | Thompson |
| 5,542,669 A | 8/1996 | Charron et al. |
| 5,544,892 A | 8/1996 | Breeding |
| 5,560,603 A | 10/1996 | Seelig et al. |
| 5,593,349 A | 1/1997 | Miguel et al. |
| 5,611,535 A | 3/1997 | Tiberio |
| 5,611,730 A | 3/1997 | Weiss |
| 5,618,045 A | 4/1997 | Kagan et al. |
| 5,628,684 A | 5/1997 | Bouedec |
| 5,643,088 A | 7/1997 | Vaughn et al. |
| 5,645,281 A | 7/1997 | Hesse et al. |
| 5,645,486 A | 7/1997 | Nagao et al. |
| 5,647,798 A | 7/1997 | Falciglia |
| 5,667,217 A | 9/1997 | Kelly et al. |
| 5,676,371 A | 10/1997 | Kelly et al. |
| 5,697,611 A | 12/1997 | Kelly et al. |
| 5,700,007 A | 12/1997 | Kelly et al. |
| 5,700,008 A | 12/1997 | Lawlor et al. |
| 5,704,612 A | 1/1998 | Kelly et al. |
| 5,707,285 A | 1/1998 | Place et al. |
| 5,743,523 A | 2/1998 | Kelly et al. |
| 5,722,891 A | 3/1998 | Inoue |
| 5,733,193 A | 3/1998 | Allard et al. |
| 5,743,532 A | 4/1998 | Lafferty |
| 5,755,621 A | 5/1998 | Marks et al. |
| 5,766,074 A | 6/1998 | Cannon et al. |
| 5,769,424 A | 6/1998 | Kelly et al. |
| 5,769,716 A | 6/1998 | Saffari et al. |
| 5,772,509 A | 6/1998 | Weiss |
| 5,779,544 A | 7/1998 | Seelig et al. |
| 5,779,549 A | 7/1998 | Walker et al. |
| 5,788,573 A | 8/1998 | Baerlocher et al. |
| 5,803,451 A | 9/1998 | Kelly et al. |
| 5,803,914 A | 9/1998 | Ryals et al. |
| 5,810,354 A | 9/1998 | Banyai |
| 5,816,918 A | 10/1998 | Kelly et al. |
| 5,823,874 A | 10/1998 | Adams |
| 5,833,536 A | 11/1998 | Davids et al. |
| 5,836,586 A | 11/1998 | Marks et al. |
| 5,836,819 A | 11/1998 | Ugawa |
| 5,848,932 A | 12/1998 | Adams |
| 5,851,148 A | 12/1998 | Brune et al. |
| 5,855,514 A | 1/1999 | Kamille |
| 5,860,648 A | 1/1999 | Petermeier et al. |
| 5,871,398 A | 2/1999 | Schneier et al. |
| 5,873,781 A | 2/1999 | Keane |
| 5,882,258 A | 3/1999 | Kelly et al. |
| 5,882,261 A | 3/1999 | Adams |
| 5,888,115 A | 3/1999 | Shoemaker, Jr. et al. |
| 5,902,184 A | 5/1999 | Bennett et al. |
| 5,910,046 A | 6/1999 | Wada et al. |
| 5,911,418 A | 6/1999 | Adams |
| 5,919,088 A | 7/1999 | Weiss |
| 5,941,770 A | 8/1999 | Miers et al. |
| 5,951,397 A | 9/1999 | Dickinson |
| 5,967,514 A | 10/1999 | Kelly et al. |
| 5,988,643 A | 11/1999 | Awada |
| 5,993,315 A | 11/1999 | Strider et al. |
| 5,997,401 A | 12/1999 | Crawford |
| 6,004,207 A | 12/1999 | Wilson, Jr. et al. |
| 6,007,426 A | 12/1999 | Kelly et al. |
| 6,012,722 A | 1/2000 | Petermeier et al. |
| 6,015,344 A | 1/2000 | Kelly et al. |
| 6,015,346 A | 1/2000 | Bennett |
| 6,117,007 A | 1/2000 | Matsuyama et al. |
| 6,019,369 A | 2/2000 | Nakagawa et al. |
| 6,019,374 A | 2/2000 | Breeding |
| 6,047,963 A | 4/2000 | Pierce et al. |
| 6,048,271 A | 4/2000 | Barcelou |
| 6,050,895 A | 4/2000 | Luciano, Jr. et al. |
| 6,033,307 A | 5/2000 | Vancura |
| 6,056,642 A | 5/2000 | Bennett |
| 6,062,981 A | 5/2000 | Luciano, Jr. et al. |
| 6,071,192 A | 6/2000 | Weiss |
| 6,089,976 A | 7/2000 | Schneider et al. |
| 6,089,977 A | 7/2000 | Bennett |
| 6,102,400 A | 8/2000 | Scott et al. |
| 6,102,402 A | 8/2000 | Scott et al. |
| 6,102,798 A | 8/2000 | Bennett |
| 6,110,039 A | 8/2000 | Oh |

(56) References Cited

U.S. PATENT DOCUMENTS

| | | |
|---|---|---|
| 6,110,041 A | 8/2000 | Walker et al. |
| 6,110,043 A | 8/2000 | Olsen |
| 6,117,008 A | 9/2000 | Machiguchi |
| 6,120,031 A | 9/2000 | Adams |
| 6,126,541 A | 10/2000 | Fuchs |
| 6,126,542 A | 10/2000 | Fier |
| 6,126,547 A | 10/2000 | Ishimoto |
| 6,135,453 A | 10/2000 | Srichayaporn |
| 6,135,884 A | 10/2000 | Hedrick et al. |
| 6,135,885 A | 10/2000 | Lermsiaux |
| 6,139,013 A | 10/2000 | Pierce et al. |
| 6,142,873 A | 11/2000 | Weiss et al. |
| 6,142,874 A | 11/2000 | Kodachi et al. |
| 6,146,273 A | 11/2000 | Olsen |
| 6,149,156 A | 11/2000 | Feola |
| 6,159,095 A | 12/2000 | Frohm et al. |
| 6,159,097 A | 12/2000 | Gura |
| 6,159,098 A | 12/2000 | Slomiany et al. |
| 6,165,070 A | 12/2000 | Nolte et al. |
| 6,173,955 B1 | 1/2001 | Perrie et al. |
| 6,174,235 B1 | 1/2001 | Walker et al. |
| 6,174,237 B1 | 1/2001 | Stephenson |
| 6,190,255 B1 | 2/2001 | Thomas et al. |
| 6,193,606 B1 | 2/2001 | Walker et al. |
| 6,210,279 B1 | 4/2001 | Dickinson |
| 6,220,593 B1 | 4/2001 | Pierce et al. |
| 6,220,961 B1 | 4/2001 | Keane et al. |
| 6,224,482 B1 | 5/2001 | Bennett |
| 6,224,483 B1 | 5/2001 | Mayeroff |
| 6,224,484 B1 | 5/2001 | Okuda et al. |
| 6,227,971 B1 | 5/2001 | Weiss |
| 6,231,442 B1 | 5/2001 | Mayeroff |
| 6,231,445 B1 | 5/2001 | Acres |
| 6,234,897 B1 | 5/2001 | Frohm et al. |
| 6,238,288 B1 | 5/2001 | Walker et al. |
| 6,251,013 B1 | 6/2001 | Bennett |
| 6,261,177 B1 | 7/2001 | Bennett |
| 6,267,669 B1 | 7/2001 | Luciano, Jr. et al. |
| 6,270,409 B1 | 8/2001 | Shuster |
| 6,270,411 B1 | 8/2001 | Gura et al. |
| 6,279,910 B1 | 8/2001 | De Keller |
| 6,287,194 B1 | 9/2001 | Okada et al. |
| 6,290,600 B1 | 9/2001 | Glasson |
| 6,290,603 B1 | 9/2001 | Luciano, Jr. |
| 6,293,866 B1 | 9/2001 | Walker et al. |
| 6,302,790 B1 | 10/2001 | Brossard |
| 6,309,298 B1 | 10/2001 | Gerou |
| 6,309,299 B1 | 10/2001 | Weiss |
| 6,309,300 B1 | 10/2001 | Glavich |
| 6,312,334 B1 | 11/2001 | Yoseloff |
| 6,315,660 B1 | 11/2001 | Demar et al. |
| 6,322,309 B1 | 11/2001 | Thomas et al. |
| 6,328,649 B1 | 12/2001 | Randall et al. |
| 6,346,043 B1 | 2/2002 | Colin et al. |
| 6,347,996 B1 | 2/2002 | Gilmore et al. |
| 6,364,765 B1 | 4/2002 | Walker et al. |
| 6,364,766 B1 | 4/2002 | Anderson et al. |
| 6,364,768 B1 | 4/2002 | Acres et al. |
| 6,375,187 B1 | 4/2002 | Baerlocher |
| 6,379,245 B2 | 4/2002 | De Keller |
| 6,386,974 B1 | 5/2002 | Adams |
| 6,390,473 B1 | 5/2002 | Vancura et al. |
| 6,398,219 B1 | 6/2002 | Pierce et al. |
| 6,406,369 B1 | 6/2002 | Baerlocher et al. |
| 6,413,160 B1 | 7/2002 | Vancura |
| 6,413,161 B1 | 7/2002 | Baerlocher et al. |
| 6,435,511 B1 | 8/2002 | Vancura et al. |
| 6,443,837 B1 | 9/2002 | Jaffe et al. |
| 6,454,651 B1 | 9/2002 | Yoseloff |
| 6,461,241 B1 | 10/2002 | Webb et al. |
| 6,467,771 B1 | 10/2002 | de Keller |
| 6,488,580 B1 | 12/2002 | Robb |
| 6,506,118 B1 | 1/2003 | Baerlocher et al. |
| 6,522,312 B2 | 2/2003 | Ohshima et al. |
| 6,537,150 B1 | 3/2003 | Luciano et al. |
| 6,554,704 B2 | 4/2003 | Nicastro et al. |
| 6,569,015 B1 | 5/2003 | Baerlocher et al. |
| 6,572,473 B1 | 6/2003 | Baerlocher |
| 6,582,306 B1 | 6/2003 | Kaminkow |
| 6,599,193 B2 | 7/2003 | Baerlocher et al. |
| 6,602,137 B2 | 8/2003 | Kaminkow et al. |
| 6,605,002 B2 | 8/2003 | Baerlocher |
| 6,607,438 B2 | 8/2003 | Baerlocher et al. |
| 6,632,140 B2 | 10/2003 | Berman et al. |
| 6,632,141 B2 | 10/2003 | Webb et al. |
| 6,645,075 B1 | 11/2003 | Gatto et al. |
| 6,648,754 B2 | 11/2003 | Baerlocher et al. |
| 6,656,040 B1 | 12/2003 | Brosnan et al. |
| 6,663,489 B2 * | 12/2003 | Baerlocher ............ G07F 17/32 463/16 |
| 6,682,419 B2 | 1/2004 | Webb et al. |
| 6,682,420 B2 | 1/2004 | Webb et al. |
| 6,692,003 B2 | 2/2004 | Potter et al. |
| 6,709,332 B2 | 3/2004 | Adams |
| 6,722,976 B2 | 4/2004 | Adams |
| 6,733,386 B2 | 5/2004 | Cuddy et al. |
| 6,733,389 B2 | 5/2004 | Webb et al. |
| 6,761,632 B2 | 7/2004 | Basenmer et al. |
| 6,767,284 B1 | 7/2004 | Koza |
| 6,769,983 B2 | 8/2004 | Slomiany |
| 6,780,103 B2 | 8/2004 | Bansemer et al. |
| 6,780,111 B2 | 8/2004 | Cannon et al. |
| 6,786,824 B2 | 9/2004 | Cannon |
| 6,811,482 B2 | 11/2004 | Letovsky |
| 6,817,948 B2 | 11/2004 | Pascal et al. |
| 6,832,959 B2 | 12/2004 | Baerlocher |
| 6,837,793 B2 | 1/2005 | McClintic |
| 6,851,674 B2 | 2/2005 | Pierce et al. |
| 6,852,027 B2 | 2/2005 | Kaminkow et al. |
| 6,863,606 B1 | 3/2005 | Berg et al. |
| 6,896,261 B2 | 5/2005 | Pierce et al. |
| 6,923,720 B2 | 8/2005 | Loose |
| 6,942,568 B2 | 9/2005 | Baerlocher |
| 6,981,917 B2 | 1/2006 | Webb et al. |
| 7,052,011 B2 | 5/2006 | Pierce et al. |
| 7,156,735 B2 | 1/2007 | Brosnan et al. |
| 7,169,046 B2 | 1/2007 | Webb et al. |
| 7,192,344 B2 | 3/2007 | Baerlocher |
| 7,237,775 B2 * | 7/2007 | Thomas ............... G07F 17/3286 273/138.2 |
| 7,284,756 B2 | 10/2007 | Pierce et al. |
| 7,326,115 B2 | 2/2008 | Baerlocher |
| 7,357,714 B2 | 4/2008 | Tessmer et al. |
| 7,597,618 B2 | 10/2009 | Webb et al. |
| 2001/0040343 A1 | 11/2001 | Falciglia, Sr. |
| 2002/0049084 A1 | 4/2002 | Hughs-Baird et al. |
| 2002/0059252 A1 | 5/2002 | Yamaguchi |
| 2002/0094856 A1 * | 7/2002 | Bennett ............... G07F 17/3213 463/16 |
| 2002/0107065 A1 | 8/2002 | Rowe |
| 2002/0128055 A1 | 9/2002 | Adams |
| 2002/0151342 A1 | 10/2002 | Tracy et al. |
| 2002/0160825 A1 | 10/2002 | Nicastro et al. |
| 2003/0013519 A1 | 1/2003 | Bennett |
| 2003/0064773 A1 | 4/2003 | Baerlocher et al. |
| 2003/0104854 A1 | 6/2003 | Cannon |
| 2003/0104860 A1 | 6/2003 | Cannon et al. |
| 2003/0114209 A1 | 6/2003 | Ritner, Jr. et al. |
| 2003/0114218 A1 | 6/2003 | McClintic |
| 2003/0114219 A1 | 6/2003 | McClintic |
| 2003/0114220 A1 | 6/2003 | McClintic |
| 2003/0119576 A1 | 6/2003 | McClintic et al. |
| 2003/0119581 A1 | 6/2003 | Cannon et al. |
| 2003/0125102 A1 | 7/2003 | Cannon |
| 2003/0125107 A1 | 7/2003 | Cannon |
| 2003/0171144 A1 | 9/2003 | Letovsky |
| 2003/0211881 A1 | 11/2003 | Walker et al. |
| 2003/0216168 A1 | 11/2003 | Cannon et al. |
| 2004/0048659 A1 | 3/2004 | Seelig et al. |
| 2004/0106446 A1 | 6/2004 | Cannon et al. |
| 2004/0116173 A1 | 6/2004 | Baerlocher |
| 2004/0116174 A1 | 6/2004 | Baerlocher et al. |
| 2004/0171415 A1 * | 9/2004 | Webb ................. G07F 17/32 463/16 |

(56) References Cited

U.S. PATENT DOCUMENTS

| | | | |
|---|---|---|---|
| 2004/0176156 A1* | 9/2004 | Walker | G07F 17/32 463/16 |
| 2004/0198490 A1 | 10/2004 | Bansemer et al. | |
| 2004/0204226 A1 | 10/2004 | Foster et al. | |
| 2004/0204228 A1* | 10/2004 | Walker | G07F 17/3244 463/20 |
| 2005/0020340 A1 | 1/2005 | Cannon | |
| 2005/0026664 A1 | 2/2005 | Bansemer et al. | |
| 2005/0181853 A1 | 8/2005 | Baerlocher | |
| 2006/0040735 A1 | 2/2006 | Baerlocher | |
| 2006/0211475 A1 | 9/2006 | Walker et al. | |
| 2006/0211478 A1 | 9/2006 | Walker et al. | |
| 2006/0247012 A1 | 11/2006 | Walker et al. | |
| 2007/0099688 A1 | 5/2007 | Brosnan et al. | |
| 2008/0108406 A1 | 5/2008 | Oberberger | |
| 2008/0108425 A1 | 5/2008 | Oberberger | |
| 2008/0119283 A1 | 5/2008 | Baerlocher | |
| 2009/0029758 A1 | 1/2009 | Young | |
| 2009/0061991 A1 | 3/2009 | Popovich et al. | |
| 2009/0061997 A1 | 3/2009 | Popovich et al. | |
| 2009/0061998 A1 | 3/2009 | Popovich et al. | |
| 2009/0061999 A1 | 3/2009 | Popovich et al. | |
| 2011/0183755 A1* | 7/2011 | Jackson | G07F 17/32 463/31 |

OTHER PUBLICATIONS

Partially-highlighted copy of JP 2007-054109A and English translation of paragraphs [0020] and [0021] of same submitted with Third Party Submission in Published Application Under 37 C.F.R. 1.99 on Dec. 27, 2011, for U.S. Appl. No. 12/768,380 (3 pages).

\* cited by examiner

FIG. 5C

| Bumper | Trigger 1 | T / ΔT | Trigger 2 | T / ΔT | Trigger 3 | T / ΔT | Trigger 4 | Trigger 5 | Trigger 6 |
|---|---|---|---|---|---|---|---|---|---|
| 777 (200a) | 2:49 | 2.0 | 2:465 | 0.5 | 2:425 | 1.5 | | | |
| DD (200b) | 2:51 | 9.0 | 2:47 | 2.0 | | | | | |
| RWB (200c) | 2:44 | 2.5 | 2:42 | 0.5 | | | | | |

200

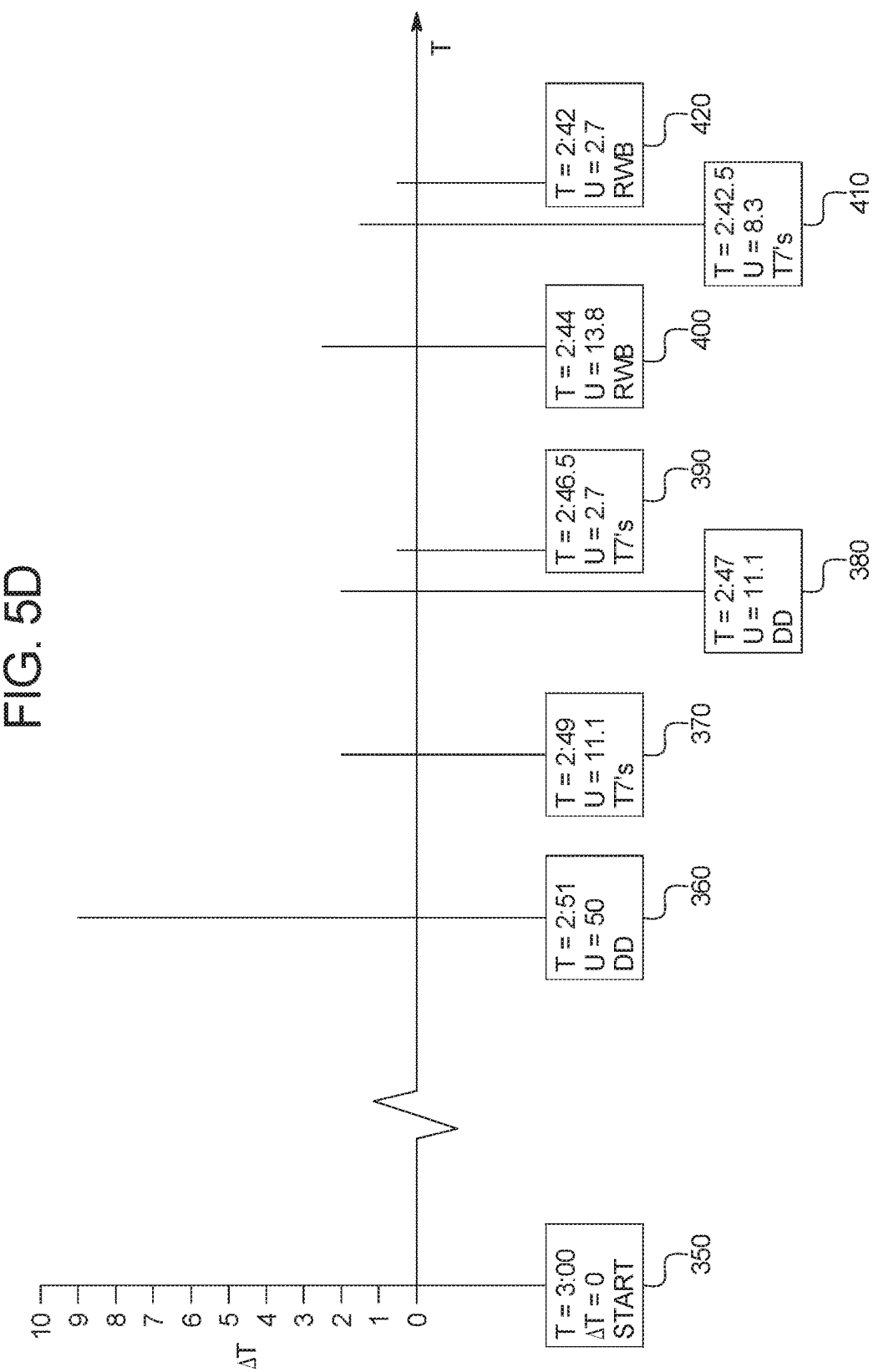

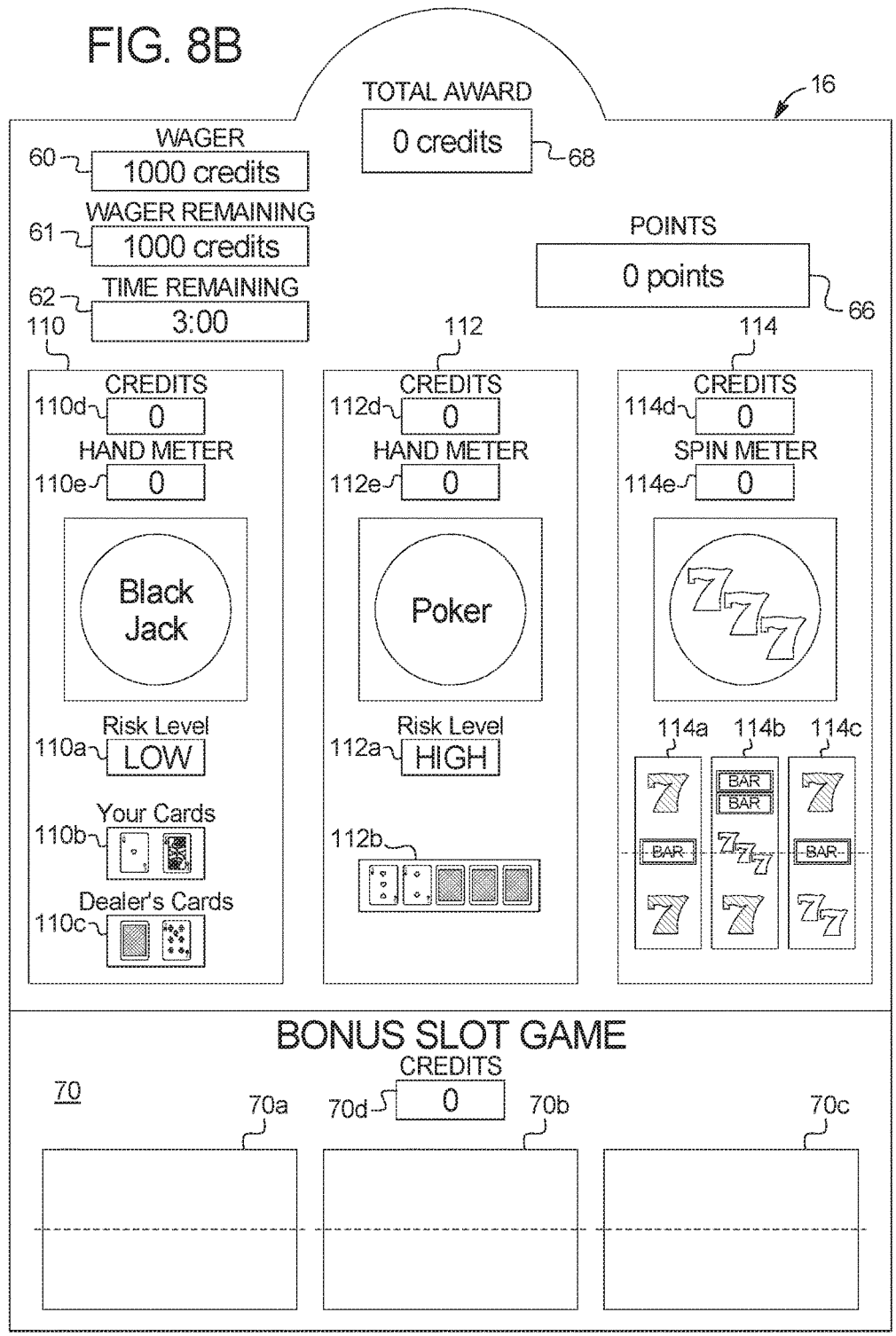

GAMING SYSTEM, GAMING DEVICE AND METHOD PROVIDING A FIRST GAME AND A PLURALITY SECOND WAGERING GAMES EACH ASSOCIATED WITH A SEPARATE ACTIVATABLE COMPONENT OF THE FIRST GAME

PRIORITY CLAIM

This application is a continuation of, and claims priority to and the benefit of, U.S. patent application Ser. No. 14/852,027, filed on Sep. 11, 2015, which is a continuation of, and claims priority to and the benefit of, U.S. patent application Ser. No. 14/643,895, filed on Mar. 10, 2015 and which issued as U.S. Pat. No. 9,159,202 on Oct. 13, 2015, which is a continuation of, and claims priority to and the benefit of, U.S. patent application Ser. No. 13/779,065, filed on Feb. 27, 2013 and which issued as U.S. Pat. No. 8,992,297 on Mar. 31, 2015, which is a continuation of, and claims priority to and the benefit of, U.S. patent application Ser. No. 12/768,350, filed on Apr. 27, 2010 and which issued as U.S. Pat. No. 8,398,475 on Mar. 19, 2013, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Primary wagering games of gaming machines in most jurisdictions are games of luck, not games of skill. For instance, in conventional slot gaming machines, the player must make a wager on the slot game to begin the slot game, and the slot gaming machine randomly determines the outcome for the slot game. The outcome may be a winning outcome or a losing outcome. The outcome determines whether the player obtains an award according to the predetermined paytable of the slot gaming machine. Most conventional slot gaming machines have an average expected payback percentage set between 80 and 99 percent.

One reason slot gaming machines are popular is because an amateur, novice or inexperienced player can play most slot games and perform as well as a seasoned or experienced slot game player (due to the random determinations of the outcomes). However, this same reason makes such slot gaming machines unpopular for certain people. In the last several decades, many people have grown accustomed to and comfortable with playing arcade skill games, home video skill games, computer skill games, casual games, handheld device skill games, and data network (e.g., Internet) skill games. Certain of these people do not want to play conventional slot gaming machines which have less interaction and often minimize requiring the player to use the player's skills. There is a continuing and growing need to provide these people wagering gaming machines which require a greater amount of interaction and which require the player to use a greater amount of the player's skills.

One problem with known wagering gaming machines which require the player to use the player's skills is that many so called skill games can be mastered by players having a high level of skill, substantial practice or both. To combat the mastering of such games and to make the economics work, the skill game may need to be made relatively difficult. This high difficulty level may be too great for inexperienced or average players to have a sufficient level of success and enjoyment at such gaming machines. It is thus difficult to provide such gaming machines where the average expected payback percentage for all players can be set to the desired percentage (e.g., between 80 and 99 percent).

Accordingly, a need exists for gaming machines which require a greater amount of interaction, which require the player to use the player's skills, and where the average expected payback percentage for all players can be set to the desired percentage (e.g., between 80 and 99 percent).

SUMMARY

Various embodiments of the present disclosure relate to gaming systems, gaming devices, and methods which provide a first skillbased game having a plurality of designated individually activatable components, and a plurality of second or chance based games each respectively associated with a different one of the individually activatable components of the first or skill based game. For each individually activatable component of the skill based game, when that individually activatable component is activated through or as a result of one or more player inputs, the chance based game associated with that individually activatable component is triggered. The chance based game at least in part randomly determines an outcome to display to the player, and any award associated with the displayed outcome. In certain embodiments, the gaming systems, gaming devices, and methods provide one or more associated additional individually activatable components in the skill based game which are selectively activated and one or more additional chance based games which are selectively triggered as further discussed below.

In operation of certain embodiments, the gaming system requires the player to make an initial wager amount which will be used for the play of the second or chance based games. The gaming system then enables the player to play the skill based game. As the player plays the skill based game, the player's inputs in the skill based game activate the individually activatable components of the skill based game. Each activation of the activatable components of the skill based game respectively causes the chance based game associated with that component to be triggered. Each triggered chance based game results in a wager being made, a randomly determined outcome displayed to the player, and a determination being made based on at least the wager and the outcome. The gaming system provides the player any award associated with each displayed randomly determined outcome. The awards are based on the displayed outcome and the portion of the initial wager amount associated with that activation or play of the chance based game.

In certain embodiments, the gaming system enables a player to make the initial wager amount in exchange for a designated amount of time during which the player can play the skill based game. In one such embodiment, the gaming system is configured to determine an effective wager for each activation of each of the plays of each of the chance based games as a portion of the initial wager placed, depending upon time as it relates to the pending gaming session. In certain embodiments, the gaming system determines the effective wager as a percentage of the initial wager based on the time which elapsed between designated triggering conditions, such as triggering of each of the individually activatable components.

In various embodiments, the gaming system enables a player to enable one or more bonus individually activatable components upon reaching a certain predefined condition. In one such embodiment, a bonus individually activatable component is enabled (or "unlocked") upon the player reaching a certain point total. In another such embodiment, the bonus individually activatable component is enabled upon the activation of one or more different individually activatable components.

Additional features and advantages are described in, and will be apparent from, the following Detailed Description and the figures.

BRIEF DESCRIPTION OF THE FIGURES

FIG. 5C is an example data table maintained by one embodiment of the gaming system of FIGS. 3A to 5B.

FIG. 5D is an example timeline of certain information maintained by one embodiment of the gaming system of FIGS. 3A to 5B.

FIG. 8B is a front diagrammatic view of the upper housing of the embodiment of the gaming system of FIG. 8A.

DETAILED DESCRIPTION

Figure 1:
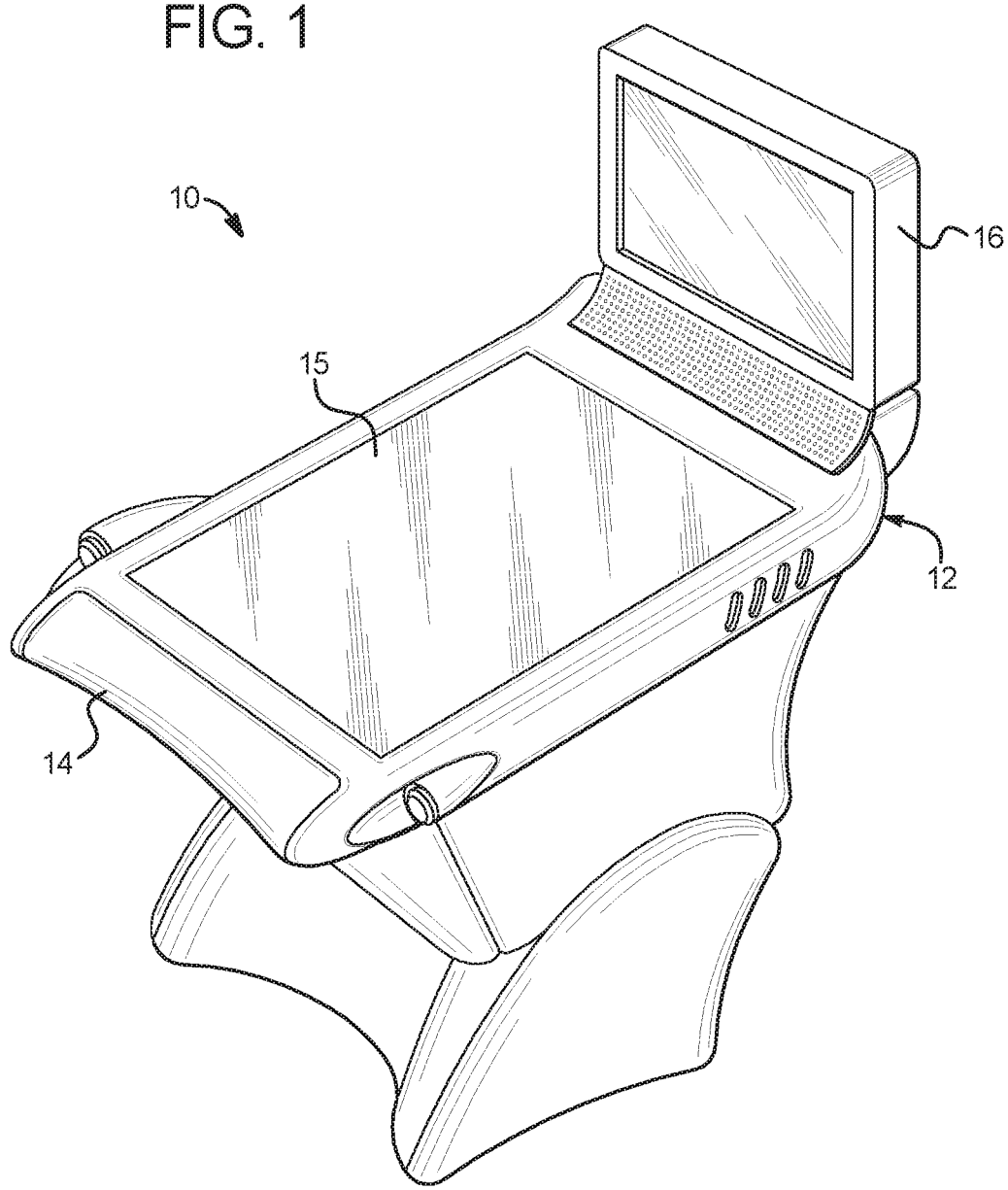
FIG. 1 is a front diagrammatic perspective view of one embodiment of a gaming system disclosed herein.
Figure 2:
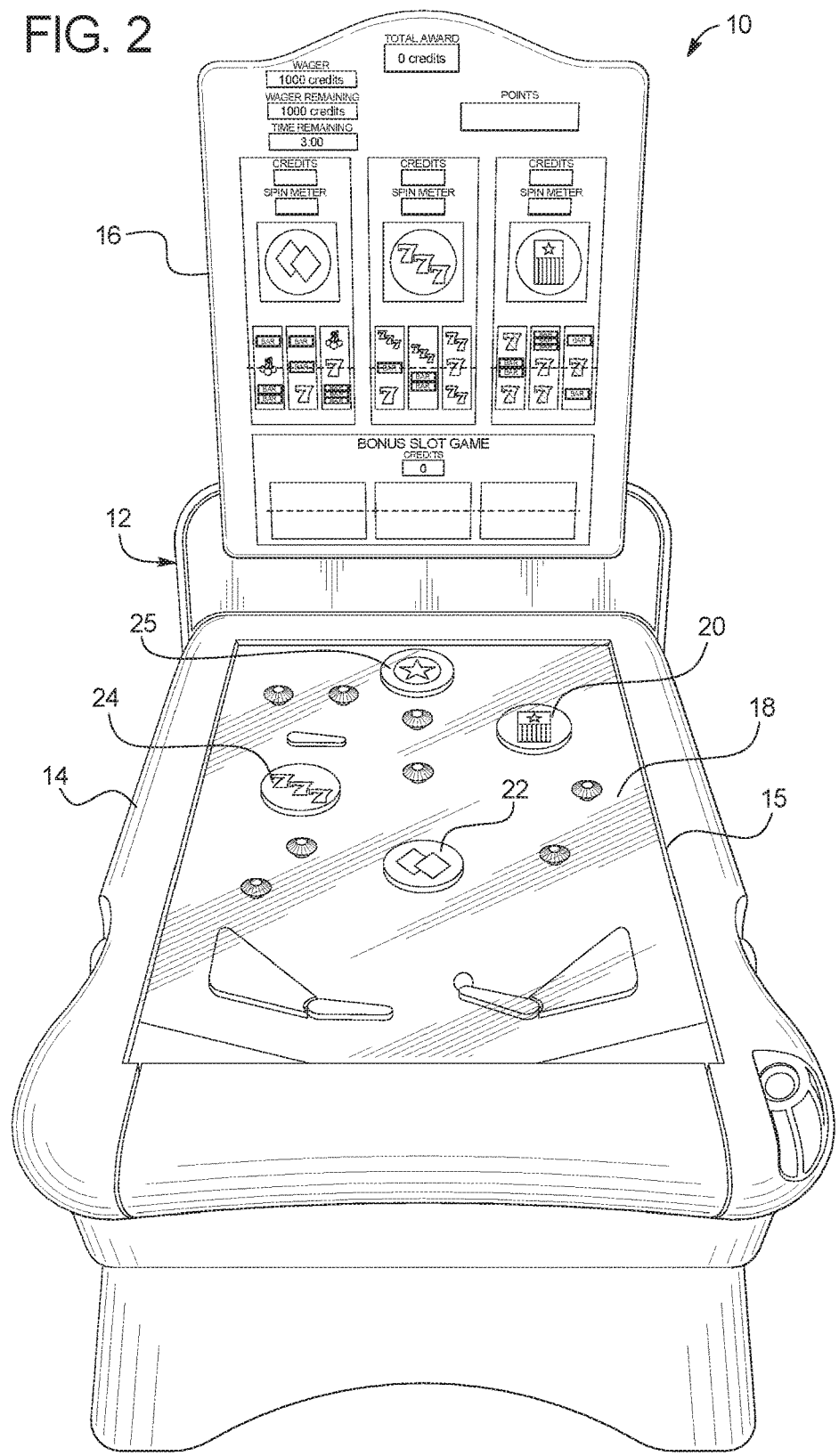
FIG. 2 is a front perspective view of another embodiment of the gaming system of the present disclosure.

Referring now to the drawings, and in particular to FIG. 1, one example embodiment of the gaming system or gaming device of the present disclosure is diagrammatically illustrated. This example gaming system 10 includes a cabinet 12 having a first or lower housing 14 and a second or upper housing 16 suitably attached to the first or lower housing 14. In a different example embodiment, the gaming system is housed in an alternative cabinet, as illustrated in FIG. 2. The lower housing 14 supports a pinball game display device 15, which includes a playfield 18, a plurality of individually activatable components such as bumpers 20, 22, and 24, a plurality of non-activatable components such as rails 30, 32, and 34, a plurality of flippers 36, 38, and 40 and a plurality of player input devices such as player flipper buttons 42 and 44 which enable the player to respectively control the flippers and button or lever 46 which activates a ball 41 to start a play of a game.

Figure 3A:
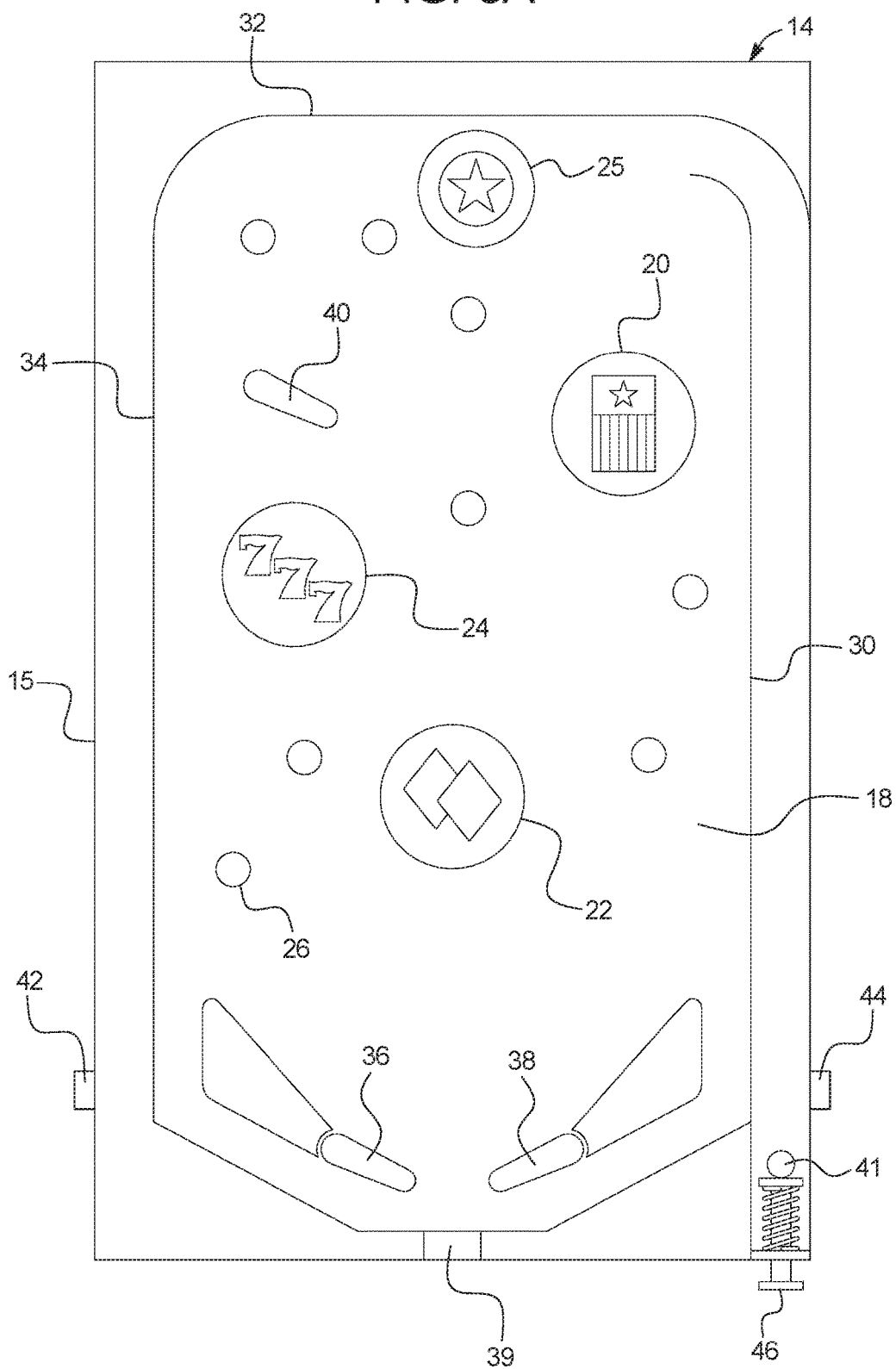
FIG. 3A is a top diagrammatic view of the lower housing of one embodiment of a gaming system disclosed herein.

The lower housing 14, as more specifically illustrated in FIG. 3A, includes an example pinball playfield 18, which includes or displays a plurality of individually activatable components, including individually activatable bumpers 20, 22, and 24. Each of the individually activatable components are associated with a different chance-based game such as the chance based games 50, 52, and 54 shown in further detail in FIG. 3B. The individually activatable bumpers and other individually activatable components are activated when struck or contacted by the ball 41 as a result of player inputs. As illustrated in FIG. 3A, each of the individually activatable components 20, 22 and 24 in the skill based pinball game are associated with a separate one of a plurality of different chance based slot games indicated by the marking displayed on the respective individually activatable bumper. When the individually activatable bumper is activated, the respective associated chance based game displayed on the upper cabinet 16 is triggered, as further discussed below. It should be appreciated that the chance based games are all preferably different games as further discussed below, but that two or more of the chance games may be the same games or the same types of games, or they can appear to the player to be the same game.

In various embodiments, each individually activatable component must be activated a designated number of times to trigger its associated chance based game. In alternative embodiments, one or more chance based games are triggered by the activation of a designated one of the individually activatable component a designated number of times. It should be appreciated that the number of player inputs does not necessarily correlate and in various embodiments will typically not correlate to the number of activations of individually activatable components. For example, the player inputs control the flippers 36, 38 and 40, and once the ball 41 is set in motion, a plurality of activations could occur with only one input by the player. In the illustrated embodiment discussed in detail below, the chance based games only require one activation of the associated individually activatable component to be triggered.

In addition to the individually activatable components 20, 22, and 24, various embodiments of the gaming system also includes a plurality of non-activatable components, such as the rails 30, 32, and 34. Non-activatable rails 30, 32 and 34 are unaffected by contact from the ball 41. It should be appreciated that one or more of the rails and flippers could be activatable components. In one embodiment, the rails and flippers in a pinball playfield are activatable components associated with a chance based game. In another embodiment, the rails and flippers are activatable components which are not associated with a chance based game, but are worth a certain point total when activated as further discussed below.

In various embodiments, the lower housing 14 also includes a plurality of individually activatable components which are each only activatable upon the occurrence of a predetermined condition. In one such example embodiment, the pinball playfield 18 includes an individually activatable bonus bumper, which is illuminated and enabled for activation when the player's score reaches a certain point threshold. For example, in FIG. 3A, bumper 25 is an individually activatable bonus bumper which is enabled for activation when the player's score reaches 5,000 points. The score at the time of the gaming system illustrated in FIG. 3A is less than 5,000 points, and therefore individually activatable bonus bumper 25 can not be activated. When the predetermined condition has been met, and the bonus individually activatable component becomes activatable, the player can cause the component to become activated, and the gaming system is configured to provide a bonus event upon a predetermined number of activations, as further discussed below.

It should be appreciated that, the individually activatable components may also be associated with a certain point total, in addition to being associated with a chance-based game. Similar to traditional pinball games, when activated, the player receives the points associated with each of these individually activatable bumpers. In one embodiment, various individually activatable components are associated with a certain point total and are not associated with a chance-based game. In one embodiment, this point value is separate from and in addition to any activation or interaction with the respective chance based slot games.

Figure 3B:
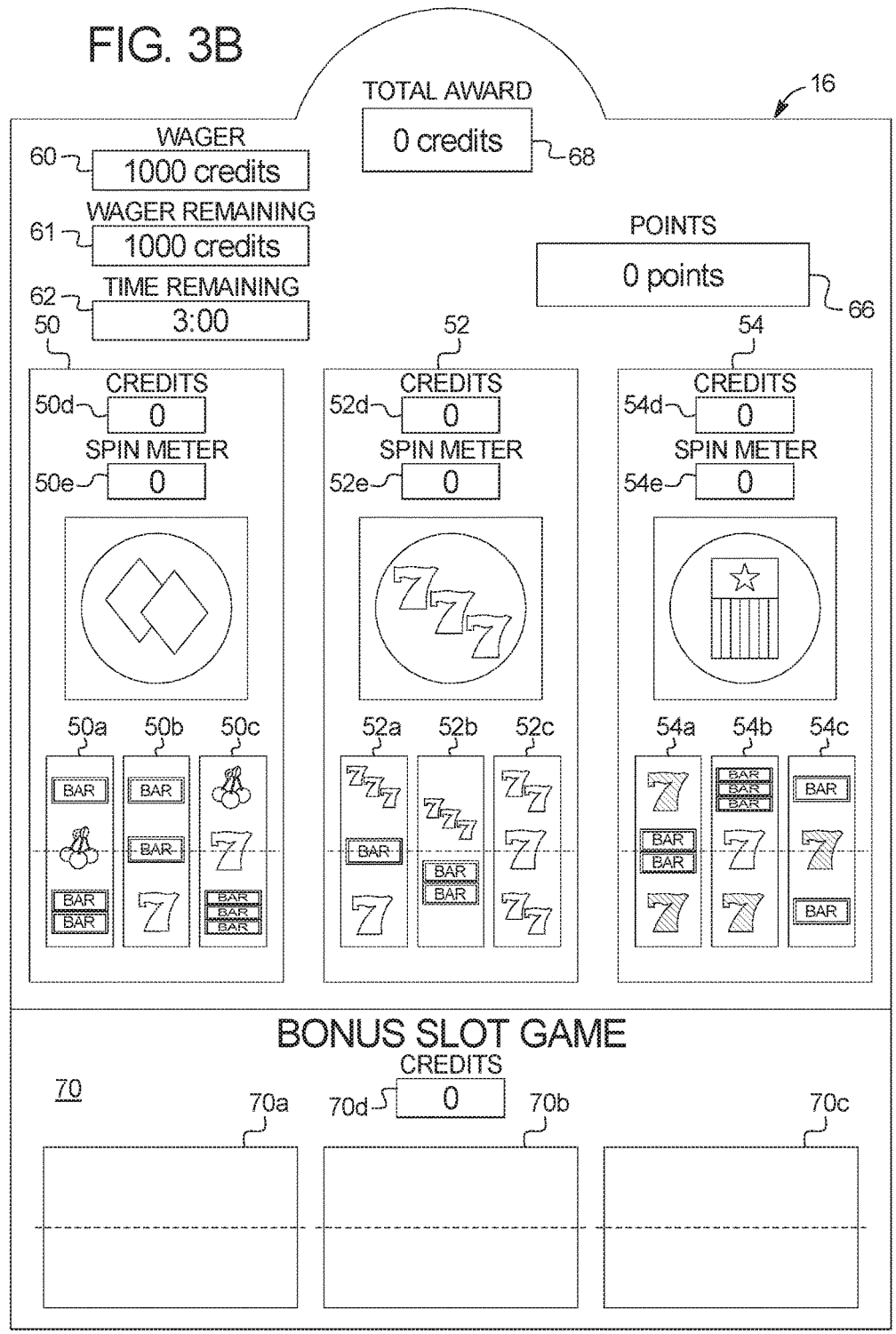
FIG. 3B is a front diagrammatic view of the upper housing the embodiment of the gaming system of FIG. 3A.

Referring now more specifically to the example upper housing illustrated in FIG. 3B, each of the example chance based slot games represented by the markings displayed on the individually activatable bumpers 20, 22, and 24 are respectively displayed to the player as three separate chance based games 50, 52 and 54 in the upper housing 16. In this example, the individually activatable bumper 20 is associated with the chance based DOUBLE DIAMOND® slot game 50 displayed in the upper housing 16 of cabinet 12. DOUBLE DIAMOND® is also a registered trademark of IGT. The individually activatable bumper 22 is associated with the chance based TRIPLE LUCKY 7'S® slot game 52 displayed in the upper housing 16 of cabinet 12. TRIPLE LUCKY 7'S® is a registered trademark of IGT. The individually activatable bumper 24 is associated with the chance based RED WHITE & BLUE® slot game 54 displayed in the upper housing 16 of cabinet 12. RED WHITE & BLUE® is also a registered trademark of IGT. These are very popular slot games and it should be appreciated that the present disclosure enables the player to play multiple popular slot games at the same time. It should also be appreciated that the chance based games could be any such slot game or any alternative chance based game, as further discussed below.

More specifically, each of the chance based slot games 50, 52, and 54 displayed in the upper housing 16 have a plurality of reels: 50a, 50b and 50c; 52a, 52b and 52c; and 54a, 54b and 54c, respectively. Each set of reels has a plurality of different symbols, which correspond with the associated slot game. For example, the chance based slot game 50 displayed is the DOUBLE DIAMOND® game, and the three reels 50a, 50b and 50c each display a plurality of different symbols which correspond to the DOUBLE DIAMOND® slot game. Similarly, the chance based slot game 52 displayed is the TRIPLE LUCKY 7'S® game, and the three reels 52a, 52b and 52c each display a plurality of different symbols which correspond to the TRIPLE LUCKY 7'S® slot game. The chance based slot game 54 displayed on the right of the upper cabinet 16 is the RED WHITE & BLUE® game, and the three reels 54a, 54b and 54c each display a plurality of different symbols which correspond to the RED WHITE & BLUE® slot game. It should be appreciated that while the skill based pinball game and chance based slot games of this example embodiment are used throughout this application, the present disclosure is not limited to this pinball game or these slot games, and that other suitable first games and these or other suitable second games may be employed in accordance with the present disclosure as further discussed below.

It should be appreciated that each of the chance based games has or is associated with a designated return to player (RTP), which corresponds to the average amount of return the player will receive over a large sample size of wagers. For example, the RED, WHITE & BLUE slot game has a RTP of $0.95 on the dollar, or 95%. The TRIPLE LUCKY 7'S slot game has a RTP of 90%, and the DOUBLE DIAMOND slot game has a RTP of 85%. In this embodiment, the DOUBLE DIAMOND slot game has the lowest AEP because it has the easiest individually activatable component to activate, the TRIPLE LUCKY 7'S slot game has a higher RTP because it has a slightly harder individually activatable component to activate, and the RED, WHITE & BLUE slot game has the highest RTP because it is the hardest of the three individually activatable components to activate. In this embodiment, the lowest RTP is associated with the individually activatable bumper which is the easiest to activate.

In addition to the display of the chance based slot games 50, 52, and 54, the upper housing 16 of the cabinet 12 includes several areas to display to the player different information about the gaming session, including a TOTAL WAGER display 60 indicating the amount of credits corresponding to the total wager placed at the beginning of the designated gaming session, a clock or time remaining display 62 indicating the time remaining in the designated gaming session, a SCORE meter display 66 indicating the total cumulative points scored during the designated gaming session, and a TOTAL AWARD display 68 indicating the total amount of credits won during the designated gaming session. The upper housing 16 of the cabinet 12 also includes a WAGER REMAINING display 100, which indicates how much of the total initial wager remains in the gaming session. In this embodiment, the upper housing 16 also includes a message display area in which the gaming system displays instructions, messages or other information to the player.

It should be appreciated, the chance based games within one embodiment have different volatilities or different levels of volatility. More volatile chance based games provide higher and lower potential awards to the player. As discussed above, a chance based game with a RTP of 85% will on average return to the player 85% of his or her total wagers on average, including several non-winning outcomes (which include payouts that are less than 85% of the player's wager) and several winning outcomes (which include payouts that are more than 85% of the player's wager). For example, one such game with higher volatility could have a maximum award of $1,000, whereas a lower volatility game could have a maximum award of $500, even though the RTP is 85% for both the high and low volatility games.

If a chance based game has high volatility, the payouts on average should still be approximately the RTP, but the gaming session will typically have more non-winning or low award winning outcomes than a low volatility game, and the gaming session will also have higher paying winning results that than those in a low volatility game. The higher awards from the winning results in a volatile chance based game balance out the higher number of non-winning results. On average, a high volatility chance based game results in the same payback as a low volatility chance based game, but the wins will be greater and the non-wins will be more numerous in the highly volatile game.

High volatility chance based games are generally riskier for the player than low volatility games if the gaming session is shorter. For example, if a player starts a gaming session at a high volatility game, that player could win a high jackpot award on the first pull. Or, that player could also start the gaming session with a streak of ten non-winning pulls in a row. If a player instead started a gaming session at a low volatility game (with the same RTP as the high volatility game, but a lower jackpot award amount), and wins the jackpot on the first pull, it will result in a lower award than the high volatility game. It is also less likely, however, that the player would experience the same ten-pull streak of non-winning plays as in the high volatility game.

Thus it should be appreciated that in various embodiments of the present disclosure, the chance based games each have the same RTP but different volatilities. In other embodiments, the chance based games each have a different RTP but the same volatilities. In other embodiments, the chance based games each have the same RTP and the same volatiles.

It should be appreciated that the lower housing 14 and the upper housing 16 are configured to co-act or work together, and when the player input causes the ball 41 to contact or activate one of the individually activatable bumpers 20, 22, or 24 in the lower housing 14 the designated number of times for that bumper, the gaming system is configured to trigger the chance based slot game associated with the bumper activated in the upper housing 16. For example, when the player, using the flippers 36, 38, and 40, causes the ball 41 to strike and activate bumper 22, the corresponding chance based TRIPLE LUCKY 7'S® slot game is activated. When the chance based slot game is activated, the reels associated with that particular chance based slot game spin and the TRIPLE LUCKY 7'S® game operates as a known slot machine game, as further discussed below. After the reels stop spinning, the symbols on each of the reels form a combination of symbols which, if appropriately arranged along one or more paylines of the slot game, results in a winning arrangement according to an associated paytable. The gaming system determines an award to provide to the player for winning arrangements based upon the associated paytable and the magnitude of the wager.

In various embodiments of the present disclosure, the magnitude and placement of each wager is determined by a suitable time based wagering system. The time based wagering system enables a player to place a total wager for a gaming session which occurs over a designated period of time. More specifically, in one such time based wagering embodiment, for the designated gaming session, each individually activatable component is activated upon the occurrence of an activating condition. In the illustrated example embodiment of FIG. 3A, the activating condition occurs when the ball 41 contacts or interacts with one of the individually activatable bumpers as a result of the player's input manipulating the ball 41 with flippers 36, 38, and 40 through input controls 42 and 44. Upon the occurrence of a designated number of activating conditions, the gaming system is configured to execute a wagering event according to certain parameters associated with the individually activatable component activated and the timing of the activating condition within the designated gaming session. For each different wagering event in a designated gaming session, upon an occurrence of an activating condition, the gaming system determines a portion of the total initial wager for an effective wager.

In various embodiments, the effective wager amount is determined at least in part by time. In certain embodiments, the effective wager amount is determined by the time elapsed since the occurrence of the immediately previous activating condition. For example, if ten seconds have elapsed out of a sixty second long designated gaming session, the effective wager of one embodiment is $^{10}\!/_{60}$ths or one sixth of the total initial wager placed at the start of the designated gaming session. Further, if in the same embodiment a second activating condition occurs at fifteen seconds, the effective wager associated with the second activating condition is based upon the difference between the time elapsed at the time of the second activating condition and the time elapsed at the time of the first activating condition (i.e., five seconds). In such an embodiment, the effective wager is one twelfth of the total initial wager (i.e., five seconds divided by sixty seconds equals one twelfth). In these described examples, the effective wager associated with each wagering event bears a linear relationship with the time elapsed in the designated gaming session and the time elapsed since an activating condition. However, it should be appreciated that in various embodiments, the effective wager does not bear a linear relationship with the time elapsed in the designated gaming session or the time elapsed since the previous activating condition in the designated gaming session.

Referring now in more detail to the FIGS. 3A to 7B, one specific example embodiment of the skill based pinball game of the present disclosure is illustrated. As described above, FIG. 3A illustrates the lower portion 14 of the pinball cabinet 12, and FIG. 3B illustrates the upper portion 16 of the pinball cabinet 12.

To start the gaming session in FIGS. 3A and 3B, the player places an initial wager of $10.00 (or 1,000 credits) as displayed 60 by the upper housing 16. As discussed above, this initial $10.00 wager 60 is a time based game wager pays for 3:00 (three) minutes as indicated by numeral 62 of game play time for the player to play the pinball game. Following the placement of the initial wager, the gaming system enables the player to begin to play the skill based game according to the traditional pinball rules and methods.

First, the player activates button or lever 43 which is configured to launch a ball 41 into the pinball playfield 18 and begin the play of the game. When the ball 41 is launched and the game is started, the gaming system is configured to start the three-minute clock decrementing toward zero. When this clock reaches zero, the gaming session is over.

When the ball enters the pinball playfield, the player uses moveable flippers 36, 38, and 40 to manipulate the ball 41 and direct it toward the individually activatable bumpers. The moveable flippers 36, 38 and 40 are controllable by player flipper buttons 42 and 44. As with traditional pinball games, one of the player's primary objectives is to prevent the ball from rolling past the flippers 36, 38 and into the well 39. Also similar to traditional pinball games, the other primary objective of the player, apart from keeping the ball in play, is to hit the individually activatable bumpers to score points. In FIG. 3A, the player aims to hit the plurality of differently sized individually activatable bumpers with the ball to both score points and to activate any associated chance based slot games.

It should be appreciated that the example below has been described with a relatively low number of activations for illustrative purposes. In most plays, due to the chaotic nature and fast pace of a pinball game, there are likely to be many more activations of the bumpers clustered much closer together than in the example below.

Figure 4A:
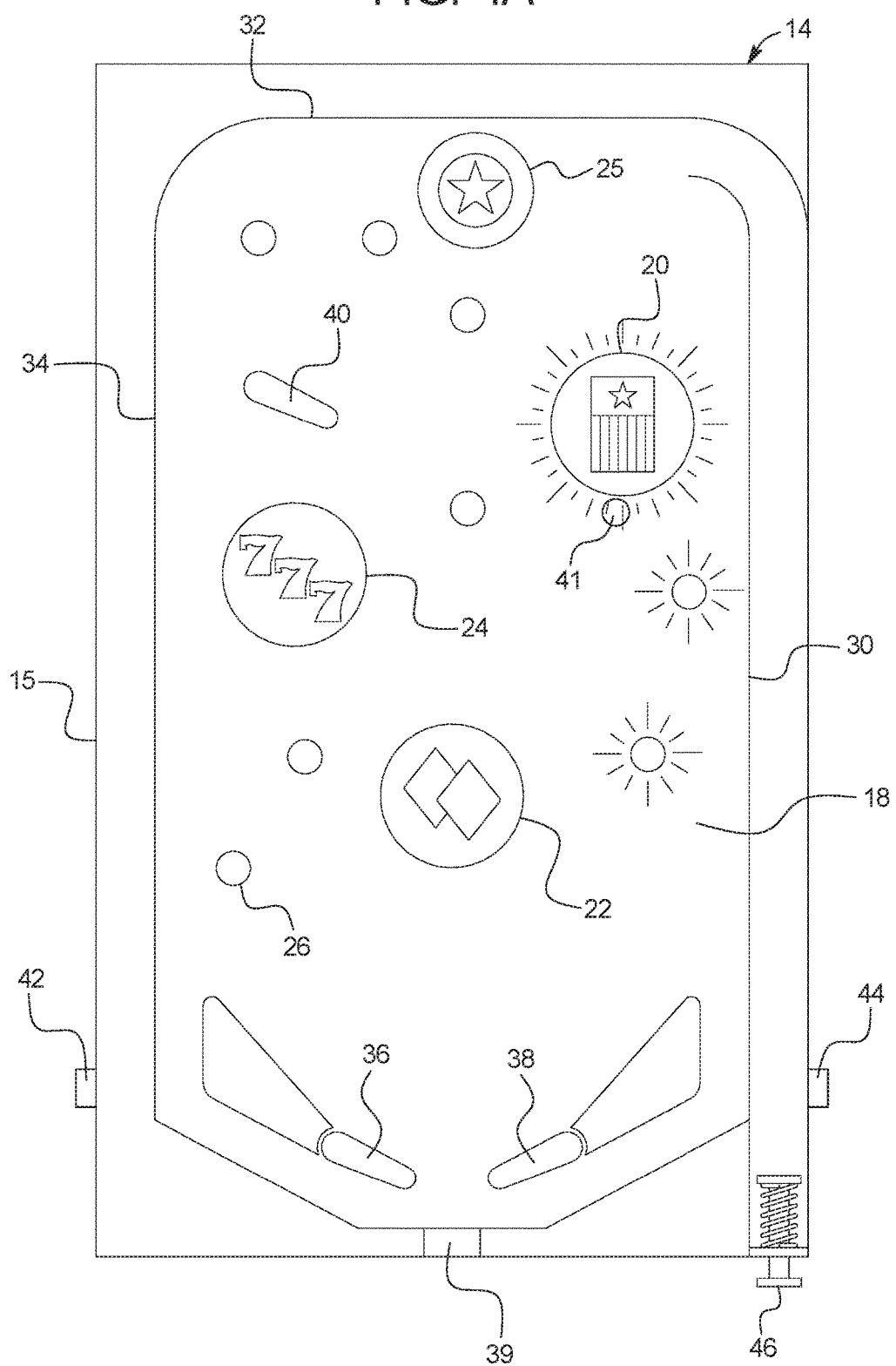
FIG. 4A is a top diagrammatic view of the lower housing of the embodiment of the gaming system of FIG. 3A at a later time in an example gaming session.
Figure 4B:
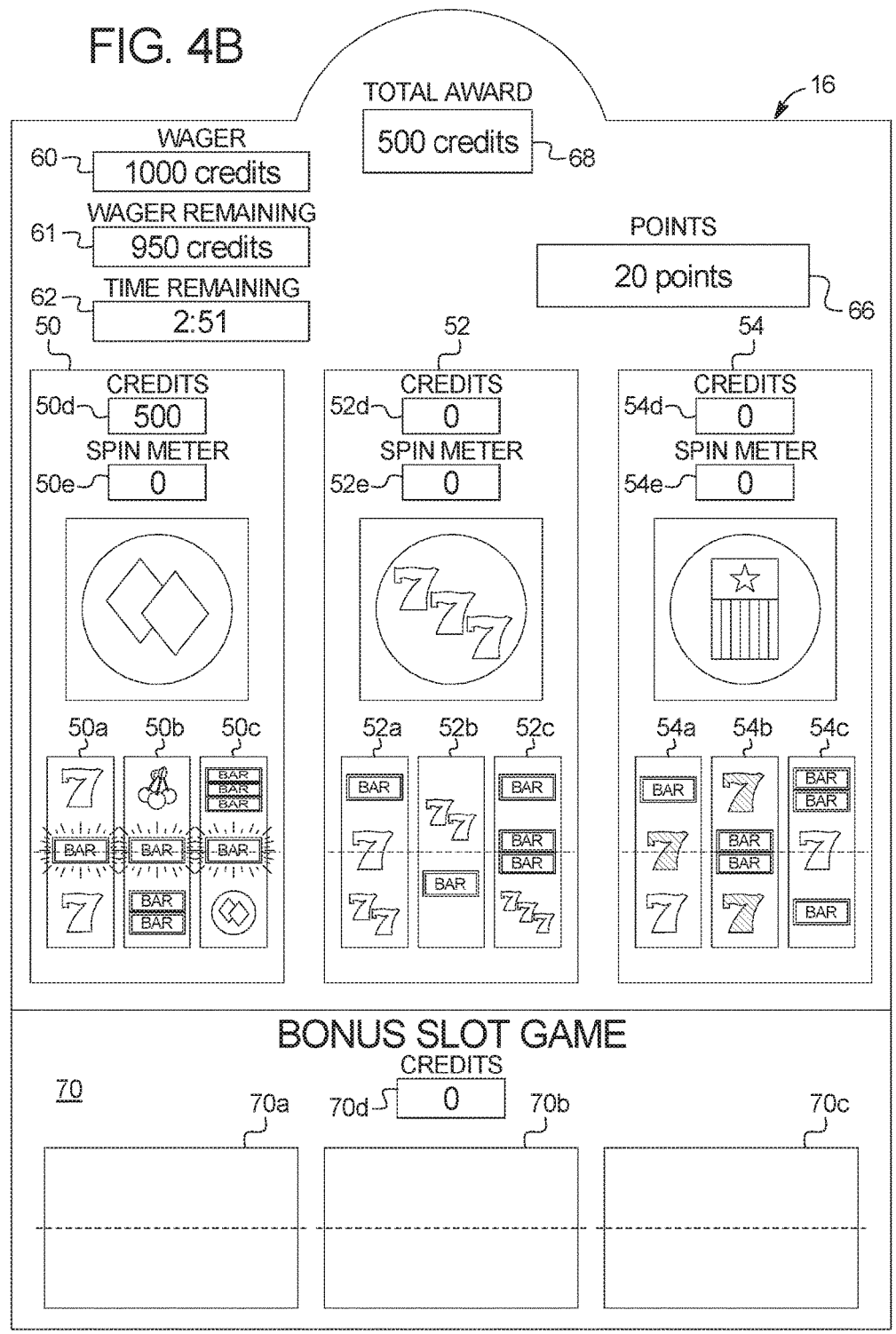
FIG. 4B is a front diagrammatic view of the upper housing of the embodiment of the gaming system of FIG. 3A corresponding to the subsequent time of the example gaming session illustrated in FIG. 4A.

Referring now to FIGS. 4A and 4B, the player has now been playing the game for nine seconds, as indicated by the decremented TIME REMAINING display 62 on the upper housing 16 of the cabinet 12 illustrated in FIG. 4B, which reads "2:51". As illustrated in FIG. 4A, the ball 41 has just struck the individually activatable bumper 20 associated with the chance based game DOUBLE DIAMOND® 50. This activating condition triggers the DOUBLE DIAMOND® 50 chance based slot game displayed in FIG. 4B. As a result of this activating condition, the gaming system is configured to spin reels 50a, 50b and 50c. The resulting combination of symbols on reels 50a, 50b and 50c is BAR-BAR-BAR respectively. According to a paytable associated with the DOUBLE DIAMOND® chance based slot game, this result is a winning combination which pays ten credits per unit wagered.

As discussed above, the magnitude of the wager is determined by the amount of time that has elapsed since the beginning of the designated gaming session or the occurrence of the immediately previous activating condition. In this embodiment, the activation of the DOUBLE DIAMOND® game is the first of the gaming session, and nine seconds have elapsed. Therefore, the magnitude of the wager placed on the activation of the DOUBLE DIAMOND® game in FIG. 4B is a proportional amount of the total wager based upon the time elapsed. Nine seconds have gone by out of a total of 180 seconds in the gaming session, which calculates to 5% of the total gaming session time elapsed. The magnitude of the wager is 5% of the total wager of $10.00 (or 1000 units), which equals a 50¢ wager (or 50 units). The gaming system determined that, for the result obtained in the DOUBLE DIAMOND® game, the pay out amount is ten credits per unit wagered. The equivalent of fifty units were wagered based upon the time gaming procedure described, and therefore the total credits awarded equal 500 credits, as displayed in the CREDITS field 50d associated with the DOUBLE DIAMOND® portion 50 of the upper housing 16.

The TRIPLE LUCKY 7'S® chance based game 52 and RED WHITE & BLUE® chance based game 54 were not activated because the player did not activate the individually activatable bumpers associated with either of the chance based games. Therefore, the CREDITS fields 52d and 54d both display 0 credits awarded by each of the TRIPLE LUCKY 7'S® 52 and RED WHITE & BLUE® 54 games respectively. The score of the game is determined by all of the individually activatable bumpers which were activated by the ball 41, whether associated with a chance based game or not. Shown in FIG. 4A, the ball 41 has hit not only the DOUBLE DIAMOND® bumper, but also two other individually activatable bumpers 100 and 102. These two bumpers are non-associated individually activatable bumpers, and only result in the accumulation of points to the player's overall score, and not any activation of a chance based game in this example embodiment. In this embodiment, each non-associated individually activatable bumper is worth ten points. It should be appreciated that different individually activatable bumpers can be worth the same or varying point values. The total points earned in the first nine seconds of the designated gaming session illustrated in FIG. 4A equal 20 points. This running point total is displayed in FIG. 4B as indicated by reference number 66. Only fifty of the 1000 credits were used for the activation of the DOUBLE DIAMOND game, and therefore the CREDITS REMAINING field 100 displays: 950 credits.

It should be appreciated that the size and location of the individually activatable components is in various embodiments integral in determining the RTP of the corresponding chance based game. As described above, in an embodiment with a larger individually activatable bumper, or a more prominently located individually activatable bumper, the bumper is easier to activate, and therefore the RTP is relatively lower.

It should be appreciated that, in various embodiments, the player's SCORE and TOTAL AWARD are separate from one another. For example, as in FIGS. 4A and 4B, the SCORE or point total is determined based solely on how many and which individually activatable bumpers the player has activated. The individual values that make up the TOTAL AWARD 68, however, are each determined randomly upon the respective activations of the chance based slot games.

In one embodiment, the player accumulates awards, but the gaming device does not maintain a SCORE, and the individually activatable components are not associated with a point total. In another embodiment, the player accumulates points and the chance to win awards during the gaming session. As further discussed below, in one such embodiment, the number of points scored is associated with the total award won, and more points scored by the player may result in more opportunities to win awards.

Figure 5A:
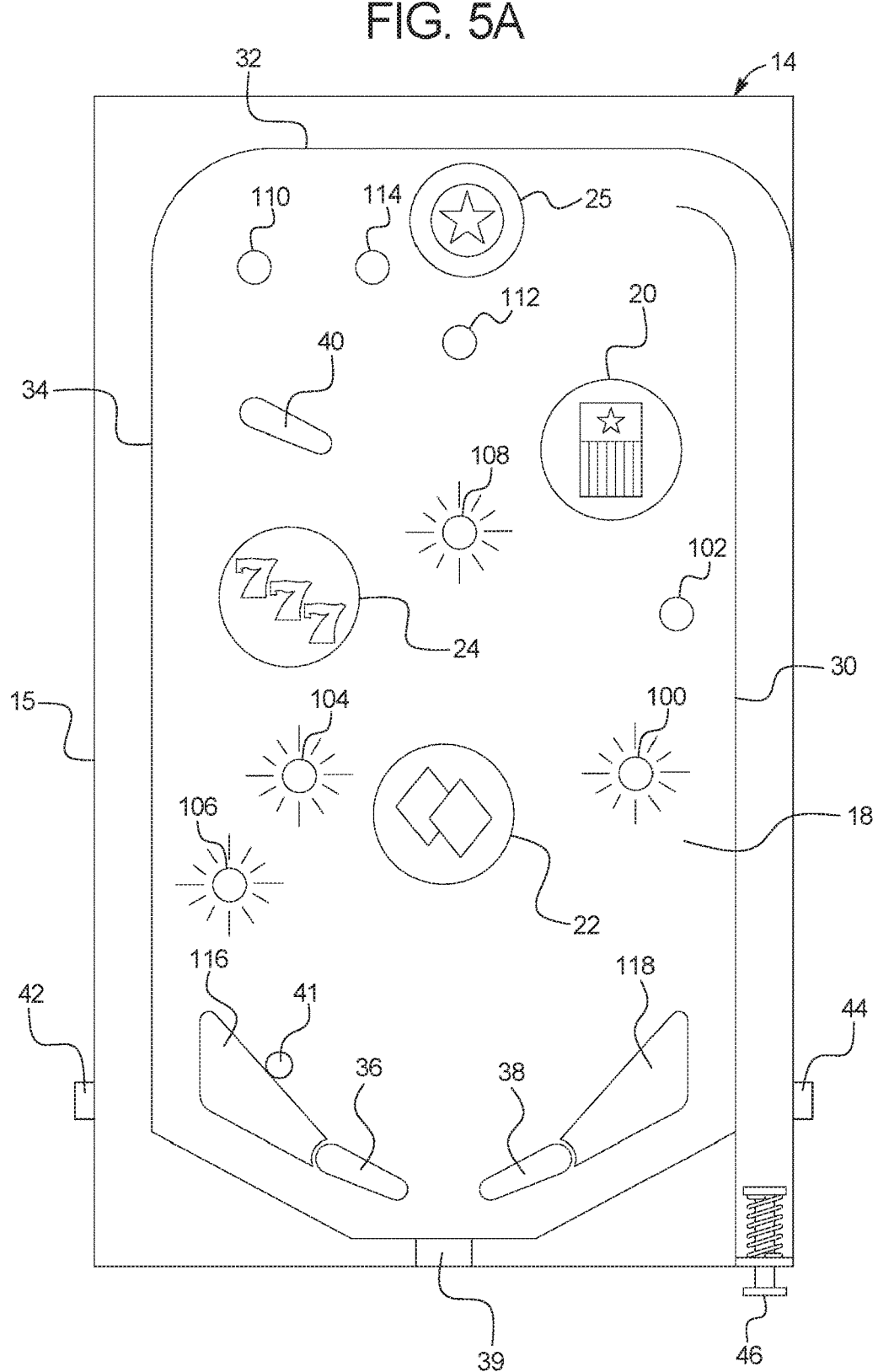
FIG. 5A is a top diagrammatic view of the lower housing of the embodiment of the gaming system of FIG. 3A at a subsequent time in the example gaming session.
Figure 5B:
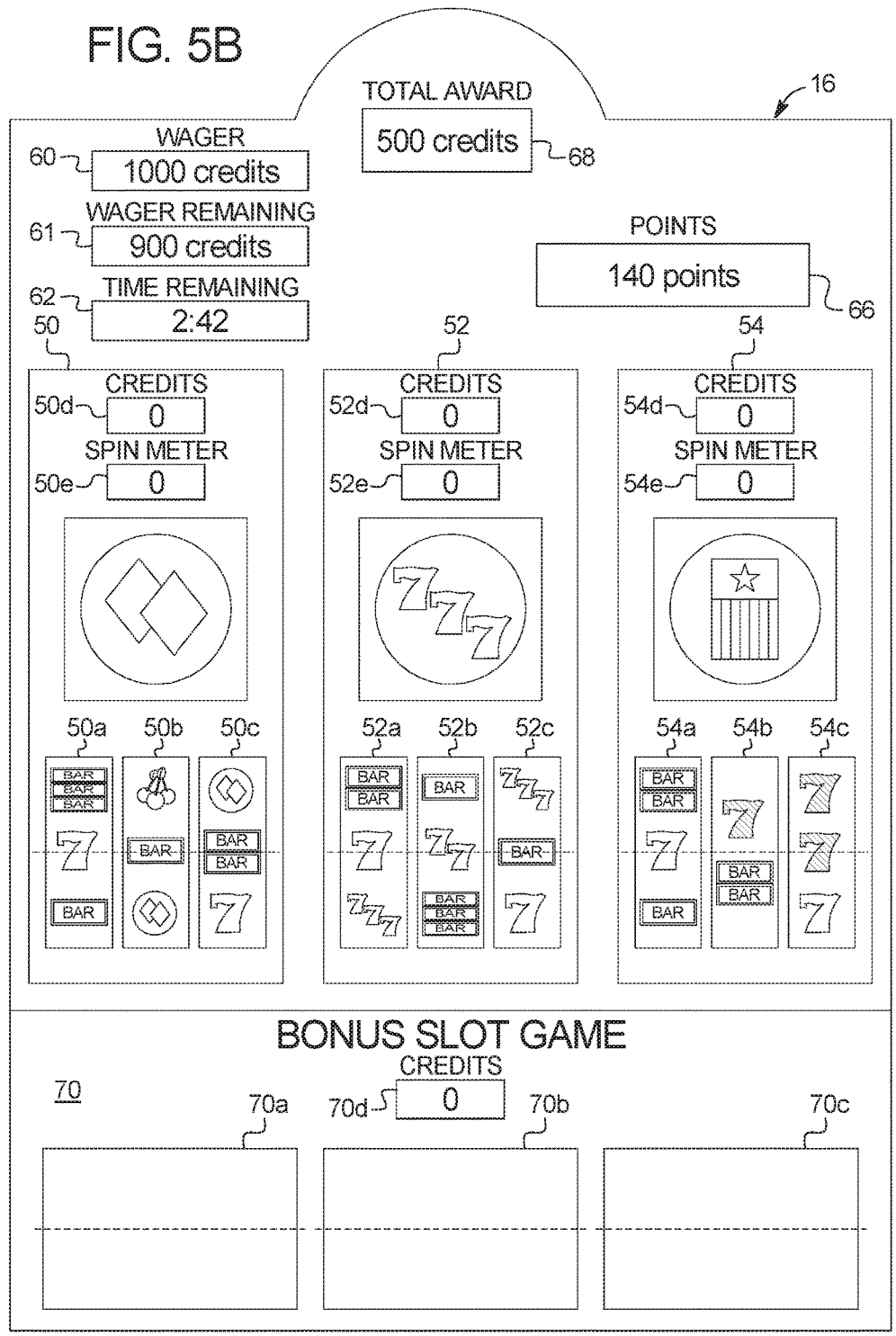
FIG. 5B is a front diagrammatic view of the upper housing of the embodiment of the gaming system of FIG. 3A corresponding to the subsequent time of the example gaming session illustrated in FIG. 5A.

Referring now to FIGS. 5A and 5B, the player has now been playing the gaming system for 18 seconds, and nine seconds have elapsed since the DOUBLE DIAMOND® game was activated, as described above. During this nine second period, the ball 41 has triggered the TRIPLE LUCKY 7'S® game three times, the DOUBLE DIAMOND® game once and the RED WHITE & BLUE® game twice. The gaming device displays a play of one of the chance based games on the upper cabinet 16 when the individually activatable bumper associated with the respective chance based game is activated.

It should be appreciated that the processor and memory device in the gaming system are configured to track the occurrence of each activating condition. In one embodiment, the memory device stores this information, which for simplification, is represented in table 200 illustrated in FIG. 5C. The table 200 has a row for each individually activatable bumper which is associated with a chance based slot game. The table 200 includes a plurality of columns for a recording plurality of activating conditions. Each time the ball 41 strikes or interacts with one of the individually activatable bumpers listed in the table 200 (i.e., bumper 20, 22, and 24), the gaming system is configured to log certain information in the table 200. As discussed above and shown in FIGS. 4A and 4B, the DOUBLE DIAMOND® chance based slot game 50 was triggered with 2:51 remaining in the designated gaming session, and the play of that game was displayed on the upper cabinet of the gaming device viewable by the player. Referring now to FIG. 5C, row B corresponds to the DOUBLE DIAMOND® chance based game and column 1 corresponds to the first activating condition for the individually activatable bumper associated with the chance based games. At 2:51 when bumper 20 was activated, and the DOUBLE DIAMOND® game was triggered and the play displayed, the gaming system logged the time of activating and the time elapsed between activating conditions in the cell intersected by row B and column 1. Therefore, that cell reads: 2:51/9.0, which means that the first activating condition occurred on the bumper associated with the DOUBLE DIAMOND® game with 2:51 remaining in the designated gaming session, and 9.0 seconds had elapsed between that activating condition and either: (i) the beginning of the designated gaming session, or (ii) the last activating condition. It should be appreciated that the table illustrated in FIG. 5C includes a plurality of blank columns in which future triggering activations will be recorded, as necessary.

Correspondingly, the multiple activating conditions which occurred on the bumpers associated with the TRIPLE LUCKY 7'S®, DOUBLE DIAMOND® and RED WHITE & BLUE® games at the point in time of FIGS. 5A and 5B have also been logged in table 200 in FIG. 5C. For example, the second activating condition of the designated gaming session occurred at 2:49 when the ball 41 activated bumper 22 associated with the TRIPLE LUCKY 7'S® game. The gaming device triggers and displays a play of the TRIPLE LUCKY 7'S® game corresponding to this activation. As shown in table 200, the time elapsed between the second activating condition and the first activating condition is 2.0 seconds. The third activating condition occurred two seconds later at 2:47 when the ball 41 activated bumper 20 associated with the DOUBLE DIAMOND® game. The gaming device triggers and displays a play of the DOUBLE DIAMOND® game corresponding with this activation. The fourth activating condition occurred 0.5 seconds later at 2:46.5 when the ball 41 activated bumper 22 associated with the TRIPLE LUCKY 7'S® game. The gaming device triggers and displays a play of the TRIPLE LUCKY 7'S® game corresponding with this activation. As recorded in column 1 row C, the fifth activating condition occurred 2.5 seconds after the fourth activating condition at 2:44 when the ball 41 activated bumper 24 associated with the RED WHITE & BLUE® game. The gaming device triggers and displays a play of the RED WHITE & BLUE® game corresponding with this activation. As recorded in column 3, row A, the sixth activating condition occurred 1.5 seconds after the fifth activating condition at 2:42.5 when the ball 41 activated the TRIPLE LUCKY 7'S® game. The gaming device triggers and displays a play of the TRIPLE LUCKY 7'S® game corresponding with this activation. As shown in column 2, row C, the seventh activating condition occurred 0.5 seconds after the sixth activating condition at 2:42 when the ball 41 activated the RED WHITE & BLUE® game. The gaming device triggers and displays a play of the RED WHITE & BLUE® game corresponding with this activation.

As discussed above, most plays of a typical pinball game would result in much more frequent and rapid activations. The number and timing of activations in the above example embodiment are intentionally spread out to more clearly illustrate the math and process involved with the time based gaming wagering system of this example.

Referring now to FIG. 5D, the data represented by table 200 is displayed graphically along a set of axes, T and ΔT. The horizontal axis T represents the time remaining in the designated gaming session, starting from three minutes and decreasing to the right. The vertical axis ΔT represents the time elapsed between activating conditions. Each activating condition displayed along this graph includes a set of information, which is shown in each of boxes 350 to 420.

In various embodiments, the gaming system is configured to trigger each chance based game associated with an activated individually activatable bumper by spinning its reels, as discussed above. As illustrated in FIG. 5D, the triggering of the chance based games come quickly due to the chaotic nature and fast game play of pinball as discussed above. For example, the trigger illustrated in box 410 is only one half of one second removed from the trigger illustrated in box 420. As a result, in many embodiments, the reels associated with the different chance based games spin simultaneously.

When a certain chance based game is triggered multiple times within a short period of time (i.e., the ball gets caught bouncing between one individually activatable bumper and another individually activatable bumper for a period), the gaming system cannot necessarily start the reels spinning at the time the associated individually activatable bumper is activated. Therefore, in certain embodiments, each of the games displayed in the upper housing 16 of the cabinet 12 include a queue such as SPIN METERs 50e, 52e, and 54e for each of the three chance based games, which respectively keep track of how many spins have been earned for each chance based game. In one such embodiment, each meter keeps track of the number of respective reel spins which must still be provided to the player, due to the back-logged number of activating conditions. For example, if the TRIPLE LUCKY 7'S® game takes 2.5 seconds to activate the reels from start to finish, and the player hits the individually activatable bumper associated with the TRIPLE LUCKY 7'S® game three times in 2.5 seconds, the SPIN METER will begin the first spin and indicate that two spins are due when the opportunity is available and the reels have stopped spinning for the first spin. It should be appreciated that the reels of associated chance based games can be configured to start and stop spinning very rapidly. In one embodiment, the reels can start as quickly as 100 milliseconds apart. In one embodiment, the reels rapidly sequentially spin similar to a series of free spins, wherein the reels spin and stop to display the outcome and any associated winning amount, only to restart again. As displayed in FIG. 5B, each of the SPIN METER displays 50e, 52e and 54e read "0" which indicates that there are no spins in the queue.

It should be appreciated that for each activation of an individually activatable component, the player need not provide an input. It should be appreciated that, the illustrated embodiment does not include a queue of spins displayed in the respective SPIN METER displays 50e, 52e, and 54e for the chance based games.

In addition to the seven activations of chance based slot games, between the first activation of the DOUBLE DIAMOND® game 50 with 2:51 remaining and the point of the game illustrated in FIG. 5B, the ball struck each of bumpers 100, 104, 106 and 108 three times. As shown in FIG. 5A, each of the activated bumpers 100, 104, 106, and 108 is illuminated. As described above, each activation of a non-associated individually activatable bumper, such as 100, 104, 106 and 108 results in the awarding of a certain point total to the player. In this embodiment, the activated individually activatable bumpers are worth ten points each. Each of the four bumpers were activated three times in the nine seconds that have elapsed between the FIG. 4 series and the FIG. 5 series. Therefore, the player has earned a total of 120 points due to activation of individually activatable bumpers which are not associated with chance based games. This point total is added to the previous point total of 20, and displayed in the SCORE meter display 66.

Figure 6A:
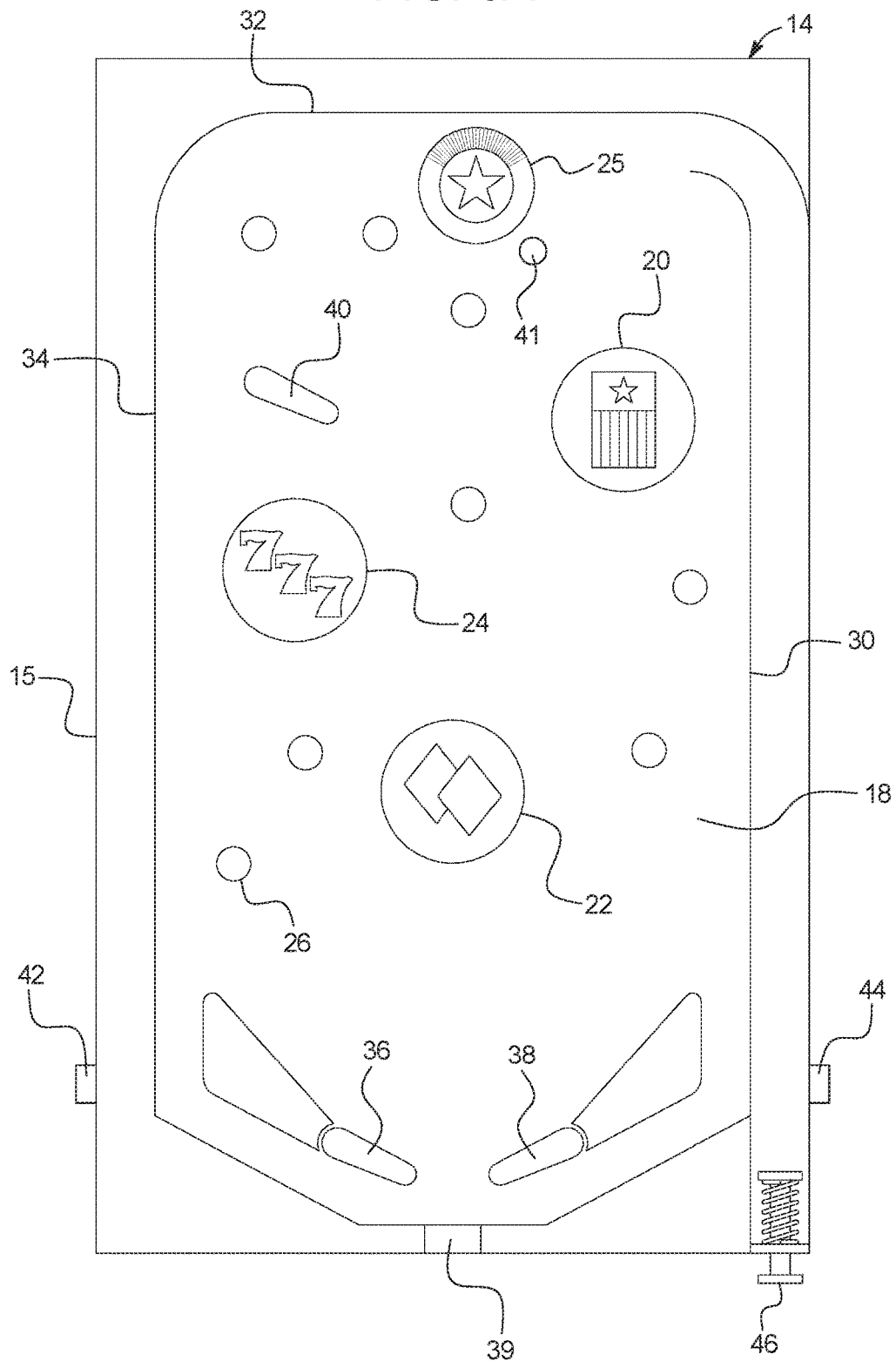
FIG. 6A is a top diagrammatic view of the lower housing of the embodiment of the gaming system of FIG. 3A at a subsequent time in the example gaming session.
Figure 6B:
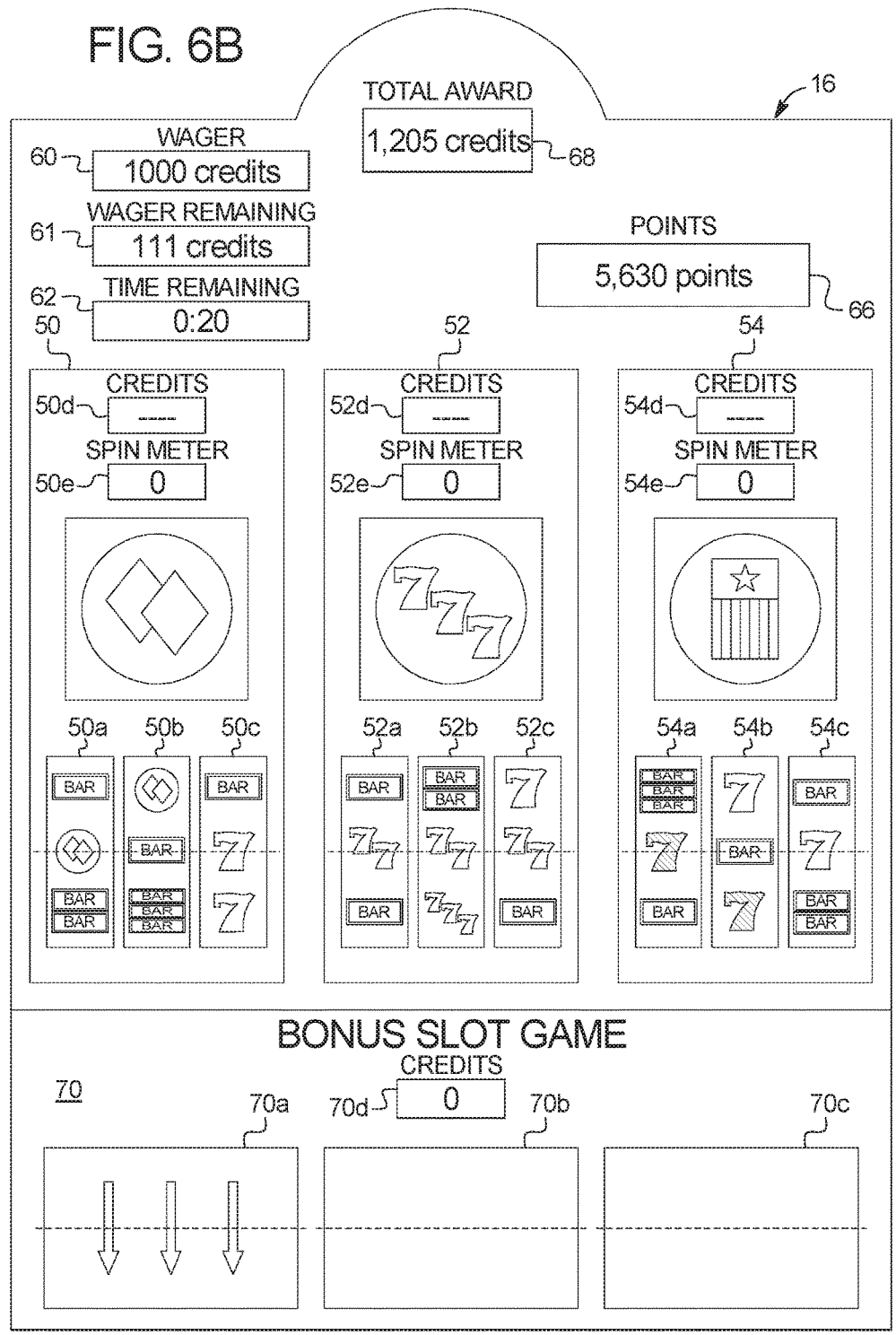
FIG. 6B is a front diagrammatic view of the upper housing of the embodiment of the gaming system of FIG. 3A corresponding to the subsequent time of the example gaming session illustrated in FIG. 6A.

Referring now to FIGS. 6A and 6B, the gaming session is nearing an end with only 20 seconds remaining until the gaming session expires, as indicated by the TIME REMAINING display 62. Several activations and events have occurred in the intervening two minutes and twenty two seconds since the state of the gaming session at FIGS. 5A to 5D.

The player has earned a total of 5,630 points. In this embodiment, when the player's score displayed in the SCORE meter 66 surpasses a predetermined threshold, a bonus event occurs. In the embodiment illustrated by FIGS. 6A and 6B, when a player's score eclipses the 5,000 point mark, a bonus individually activatable bumper appears or is enabled in the pinball playfield 18. The bonus bumper 25 in FIG. 6A becomes illuminated with the image of a star. In this embodiment, when the star bonus bumper 25 is activated by the ball 41, one reel of a chance based bonus slot game will be activated. When the bonus bumper 25 is activated a second time, a second reel associated with the chance based bonus slot game is activated. When the bonus bumper 25 is activated for a third time, the third and final reel associated with the chance based bonus slot game is activated.

In various embodiments, the first and second reels of the bonus chance based game spin once activated, and continue to spin until the bonus bumper 25 is activated for a third time, and the third reel is activated. It should be appreciated that the bonus chance based slot game of this embodiment has a RTP value greater than 100%, which guarantees a winning outcome to the player for any plays of the bonus chance based slot game. It should be appreciated that the bonus bumper 25 is situated in a rear portion of the pinball playfield 18, which makes it more difficult to activate. In various embodiments, the bonus bumper is significantly smaller than other individually activatable bumpers on the playfield 18, thereby making it more difficult to activate. Due to the high level of skill required to first earn enough points to activate the bonus bumper, and then to activate the bonus bumper three times, the reward to the player is a guaranteed winning outcome.

In the embodiment illustrated in FIGS. 6A and 6B, when the bonus bumper is activated and appears for the first time, the bonus chance based slot game is displayed 70 in the upper cabinet 16. In the illustrated embodiment, the player has activated bonus bumper 25 only one time. Therefore, the first reel 70a is spinning, and the second 70b and third 70c reels have not yet been activated. The gaming system will not award any credits to the player until all three reels are spun and an outcome is determined. As a result, the CREDITS display 70d remains at zero in FIG. 6B. Shown in FIG. 6B, the bonus bumper 25 indicates progress to the player regarding how many activations are required to activate all three bonus chance based game reels. The bonus bumper has only been activated once, therefore one third of the three circular indicator lights have been illuminated in FIG. 6A.

In addition to the activation of the bonus bumper 25, the player has increased the amount of credits won from 500 credits to 1205 credits since the last snapshot of the game at 2:42, as displayed in TOTAL AWARD 68. In the interim period between the points in time illustrated by FIG. 5 series and the points in time illustrated by FIG. 6 series, the plurality of activations have resulted in a net increase of 705 credits. Following the same time-based wagering procedure as discussed above, the three chance based slot games DOUBLE DIAMOND® 50, TRIPLE LUCKY 7'S® 52 and RED WHITE & BLUE® 54 have been triggered several times. Following each activation, the gaming system determined whether the outcomes resulted in a winning outcome, and if so, how many credits associated with that winning outcome are to be provided to the player. Similar to the above-described embodiment illustrated in FIGS. 5A to 5D, the processor and memory device tracks when each individually activatable bumper is activated, and how many credits are wagered in each associated wagering event when the corresponding chance based slot games are activated.

It should be appreciated that, in the illustrated embodiment, the effective amount of credits wagered for each wagering event resulting from an activating condition is linearly related to the time elapsed in the gaming session. As explained above in reference to the state of the game with 2:42 seconds remaining, twenty credits were wagered at that point. The total effective number of credits wagered at that point would be twenty regardless of how many times individually activatable bumpers were activated and how many wagering events occurred. In the illustrated embodiment of FIGS. 6A and 6B, only twenty seconds remain in the gaming session. Therefore, of the 1000 credits which were available for wagering at the start of the gaming session, only 111 credits remain which may be wagered on future chance based game activations (twenty seconds divided by three minutes equals 20/180, or 0.111, which is multiplied by 1000 total credits to equal 111 credits).

Figure 7A:
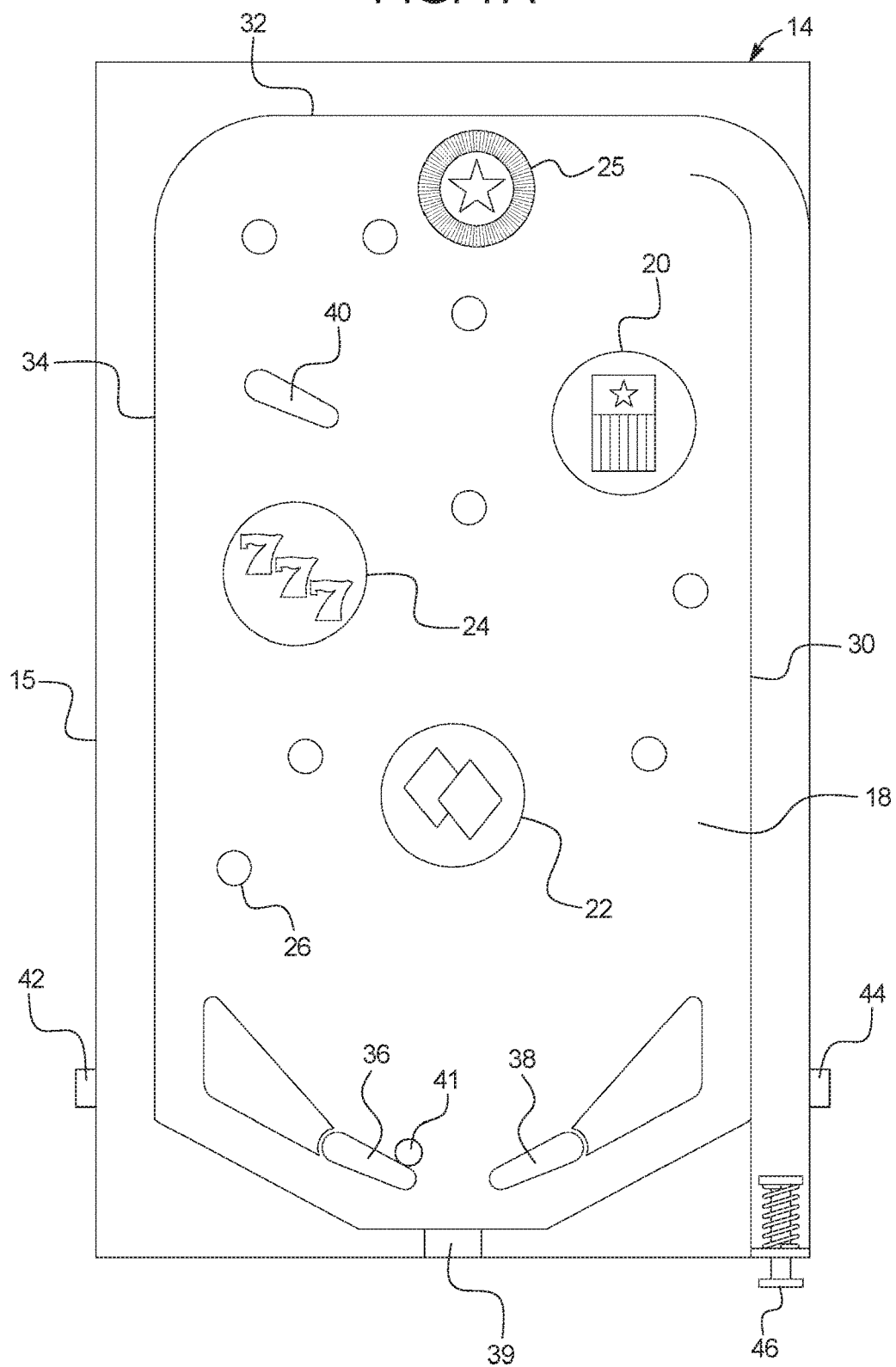
FIG. 7A is a top diagrammatic view of the lower housing of the embodiment of the gaming system of FIG. 3A at a subsequent time in the example gaming session.
Figure 7B:
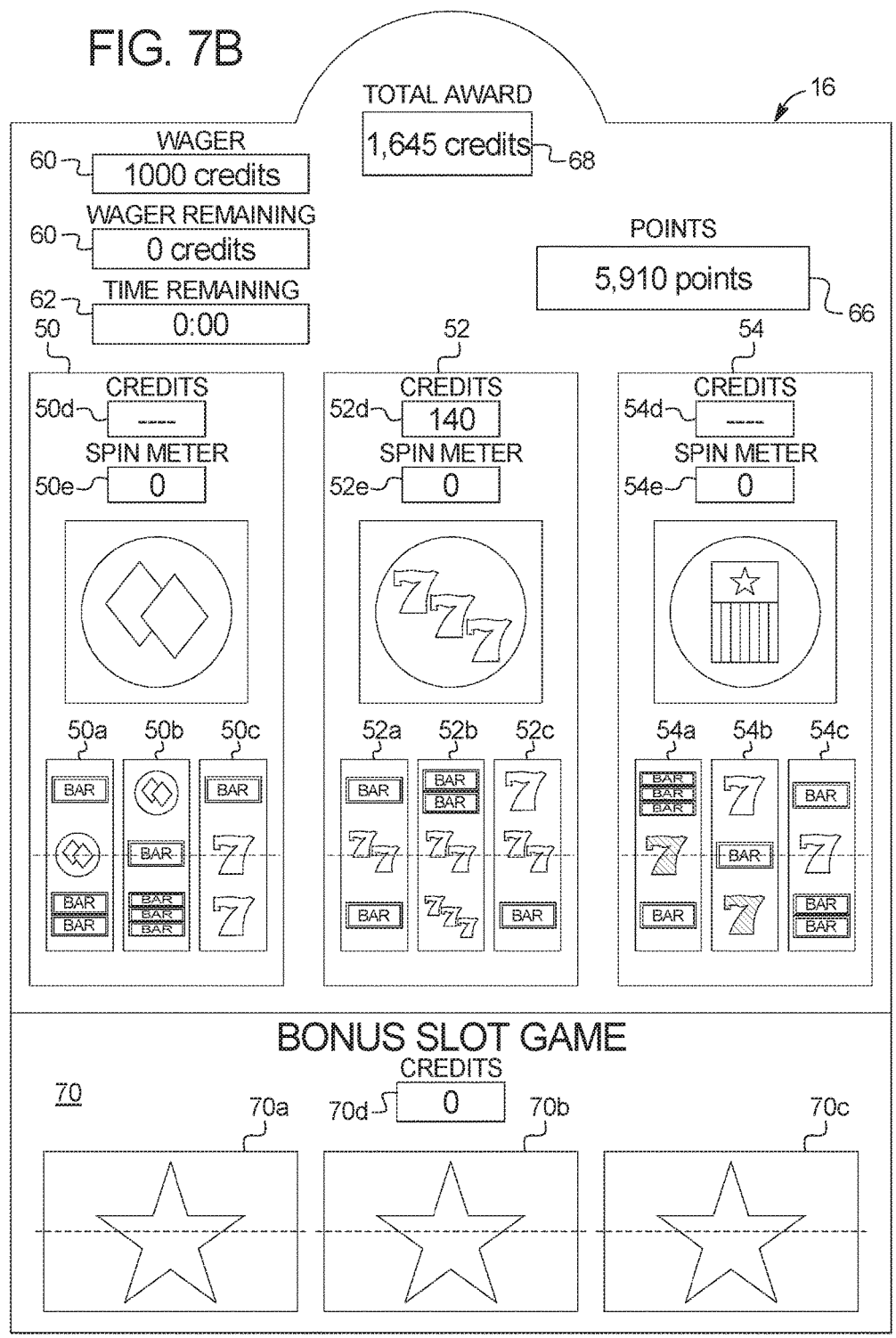
FIG. 7B is a front diagrammatic view of the upper housing of the embodiment of a gaming system of FIG. 3A corresponding to the subsequent time of the example gaming session illustrated in FIG. 7A.

Referring now to FIGS. 7A and 7B, the pinball gaming session for the illustrated embodiment has ended, as indicated by the TIME REMAINING: 0:00 as indicated by numeral 62. In the final twenty seconds between the points in time of the gaming session as illustrated in FIGS. 6A and 6B and the points in time of the gaming session illustrated in FIGS. 7A and 7B, the player has activated the bonus bumper 25 two additional times, thereby triggering the second reel 70b and third reel 70c of the bonus chance based slot game 70 as displayed in the upper housing 16. Furthermore, the player has accumulated an additional 120 points for activating twelve more non-associated individually activatable bumpers, and the player has activated the TRIPLE LUCKY 7'S® chance based game 52 once by activating the associated individually activatable bumper 22. In the final twenty seconds of the gaming session, the DOUBLE DIAMOND® 50 and RED WHITE & BLUE® 54 chance based slot games were not triggered, and therefore the reel positions for those two chance based slot games as illustrated in FIG. 6B remain unchanged in FIG. 7B.

More specifically, as illustrated in FIG. 7B, due to the activation of bonus bumper 25 two additional times, each of the three reels 70a, 70b, and 70c have spun and stopped, revealing three symbols. Furthermore, each of the three areas of the pinball playfield 18 surrounding bonus bumper 25 have been illuminated, notifying the player that the bonus chance based game is now fully activated.

It should be appreciated that, in various embodiments, the gaming system is configured to employ the same time based gaming techniques to determine each wager amount for the bonus bumper. For example, in this embodiment, the player has activated the bonus bumper at three different times in the gaming session. Each time the bonus bumper is activated, a wagering event occurs, and the gaming system determines the amount of the effective wager based upon time, similar to the above described examples with the non-bonus individually activatable bumpers. The bonus chance based slot game includes a paytable which guarantees an award of at least the amount of effective credits wagered, but the gaming system determines the number of effective credits wagered based upon when the three reels are activated due to the bonus bumper being activated the designated number of times, such as three times (i.e., in this embodiment, one for each reel). It should be appreciated that activation of the bonus bumper can cause all of the bonus reels to be activated or spun.

In one embodiment, the gaming system determines the difference in time between: (i) the first activating condition of the bonus bumper and the immediately preceding activating condition of an individually activatable bumper; (ii) the second activating condition of the bonus bumper and the immediately preceding activating condition of an individually activatable bumper; and (iii) the third activating condition of the bonus bumper and the immediately preceding activating condition of an individually activatable bumper. In such an embodiment, the gaming system adds up the three differences in time to determine the total effective credits to be wagered on the bonus chance based slot game. It should be appreciated that, in such a configuration, a player is rewarded more handsomely if his or her skill level is high enough to activate the hard to reach bonus bumper without first activating any of the individually activatable bumpers on the way.

In the embodiment illustrated in FIGS. 7A and 7B, after being spun, the three reels 70a, 70b and 70c of the bonus chance based game each display a star symbol. The total effective wager amount as calculated by the time differential corresponding to the first, second and third reel activations is multiplied by the paytable award for the winning symbol combination STAR-STAR-STAR results in a total award of 300 credits. This additional award amount is added to the cumulative TOTAL AWARD displayed in 68 to be provided to the player at the end of the gaming session. These credits are included in the TOTAL AWARD display 68 located at the top of the upper housing display device 16.

In the final twenty seconds of the gaming session, the player activated the several different non-associated individually activatable bumpers 28 times, to add a total of 280 points onto the previous score of 5,630 points, totaling 5,910 points. It should be appreciated that, in this embodiment, the points were used to "unlock" features in pinball playfield 18, such as the bonus bumper. In other embodiments, the points are used to unlock other such bonus features such as multipliers, as further described below. In various embodiments, however, because the activation of each non-associated individually activatable bumper does not include a wagering event, the points earned throughout a gaming session do not necessarily directly translate into additional award credits provided.

In addition to the activation of the bonus chance based slot game, the TRIPLE LUCKY 7'S® 52 game was activated one last time before the gaming session expired. As shown in FIG. 7B, the final activation of TRIPLE LUCKY 7'S® resulted in a winning outcome of SEVEN-SEVEN-SEVEN, as indicated by reels 52a, 52b, and 52c. When compared to the TRIPLE LUCKY 7'S® paytable and multiplied by the effective wager determined by the time since the immediately preceding individually activated bumper activating condition, this outcome results in an award of 140 credits. When added to the 1205 credits awarded with twenty seconds remaining as illustrated in FIG. 6B, and the 300 credits awarded from the bonus chance based slot game, the TOTAL AWARD calculated and provided to the player for this gaming session is 1,645 credits. When compared to the total number of 1,000 credits from the initial wager of $10.00, the player in this embodiment came out ahead by 645 credits, or $6.45.

In the above illustrated embodiment, the skill based game which includes individually activatable components associated with chance based components is a pinball game. It should be appreciated that in various embodiments, different skill based games can include similar individually activatable components and chance based components to those described above. For example, in one embodiment, an asteroids type game is employed. In another embodiment, a scavenger hunt type game is employed. It should be appreciated that any suitable base game including skill based components which are individually or selectively activatable by the player can be used with the chance based components and time based gaming contemplated by the present disclosure.

In the above-described embodiment, the individually activatable components are bumpers on a pinball machine playfield. In various embodiments, however, an individually activatable component is activated based on certain point thresholds, player status or wager amounts. In another embodiment, the individually activatable components are associated with a time-based player performance requirement. For example, in a race car game embodiment, the player will activate an individually activatable component by recording a fast lap time or checkpoint time.

It should be appreciated that the chance based components associated with the individually activatable components can result in a plurality of rewards for the player. In the above described embodiments, the result of the chance based components was an award which, if won, was provided directly to the player. In another embodiment, the chance based component is configured to provide the player an opportunity to win casino comps or promotions.

It should be appreciated that, as described below, the chance based component can be any one of a plurality of games of chance, and is not limited to slot games.

In various embodiments of the present disclosure, the skill based game and the chance based games are associated with one another to provide a player chance-based awards. In a slot game embodiment, the type of chance-based awards include base game awards associated with each individual play of the chance-based game and a paytable, or progressive awards associated with an accumulating jackpot.

In one such base game award embodiment, the individually activatable components cause each reel in an associated slot game to be activated for a chance based award opportunity, similar to the above-illustrated and described embodiment. In such an embodiment, the RTP is less than 100%, which indicates that over a large sample size of activations, the expected average return on each wager is less than 100% of the wager placed. In such an embodiment, the casino can control the odds of how much a particular chance based game will pay out to players over the long term. Although a RTP value of less than one will likely result in a player receiving a sum total award of less than the amount of wagers placed, these RTP values are not guaranteed to result in less payout to the player than wagers placed, and the player still has an opportunity to win a much higher amount than the RTP would dictate due to the randomness of the outcome determination. A more detailed discussion of the randomness of a slot game outcome determination is below.

It should be appreciated that one such game can include a RTP value of greater than 100% which indicates that over a large sample size of activations, the expected return on each wager is more than the wager itself. In one such embodiment, the game with a RTP greater than 100% can only be activated after a series of predefined activations have occurred. In such an embodiment, a more skilled player who can complete each of the series of predefined activations quickly will have a greater opportunity to earn a higher than 100% return on each wager in such a game.

In another base game award embodiment, also briefly discussed above in the illustrated embodiments, involves cooperating individual reel activations. In one such embodiment, the reels of a chance based game are each activated based upon a separate activating condition. In one embodiment, the gaming system is configured to activate each individual reel only after a predetermined sequence of events have taken place in the gaming session. For example, in one embodiment, each reel of a chance based game is not activated until the player has activated the correct sequence of individually activatable bumpers. In another embodiment, each reel of the chance based game is not activated until the player has recorded a certain threshold of points in a predetermined allotment of time. It should be appreciated that the activation of each reel in a cooperating individual reel embodiment can be activated by any suitable combination of events or set of skill-based challenges.

Other base game award embodiments, also briefly discussed above in the illustrated embodiments, involve accumulating reel activations. In one such embodiment, the reels of a chance based game are each activated based upon a certain number of activating conditions of individually activatable components. In one embodiment, each reel of the chance based game is activated after a designated individually activatable bumper is activated a predetermined number of times. For example, as discussed above in FIGS. 6A and 6B to 7A and 7B, an additional chance based game 70 was 'unlocked' and each activating condition on bumper 25 resulted in the activation of one of the three reels 70a, 70b, and 70c.

In both of the above described embodiments which include individual reel activations, the chance based game associated with the individual activating conditions have a RTP of one or more. This particular type of chance based game assures a player that the result of the chance based game, once fully activated, will pay out to the player at least the entirety of the wager placed. To fully activate a chance based game with a RTP of one or more, the player must possess more skill and knowledge of the game, and in return, the player is awarded with a higher guaranteed payout amount. In an alternative embodiment, the skill-based game is associated with a chance based game which provides an opportunity to win a progressive award, as further discussed below.

In various embodiments, the gaming system generates awards for the player based upon a combination of skill based game play and chance based game play. In the present disclosure, the gaming system of one embodiment enables the skill based gaming to affect award amounts without sacrificing the house return certainty. For example, the gaming system gives more skilled players increased opportunity to win higher awards than less skilled players while still ensuring the casino will not on average lose money on the gaming system. In various embodiments, the gaming system controls the payout of the game by adjusting the RTP of each chance based component.

In one embodiment, the gaming system is configured to set the RTP for certain of the chance based components based upon the severity of activating the associated activatable components. For example, in one embodiment, the RTP is set between 80% and 99% for the chance based slot games associated with the individually activatable bumpers.

In various embodiments, the gaming system controls the payout of the game by utilizing the time based gaming mechanisms and controlling the amount of each effective wager placed on an activated chance based game. In one embodiment, as described and illustrated in detail above, the gaming system determined the effective percentage and amount of wager placed on each activation of a chance based game based upon the time which has elapsed since the last activation of a chance based game or since the beginning of the gaming session. The quicker individually activatable components are triggered, the more activations of the associated chance based games occur. However, as a result of the method by which effective wager amounts are determined in a time-based gaming environment, quicker activations result in smaller effective wagers placed on the games. Even though a more skilled player has an increased number of activations of the chance based games, and therefore a better opportunity to receive a higher relative payout in one or more of those activations, the wagers for each activation are diminutive by comparison to a less skilled player who has caused fewer activations with more time elapsed between them and therefore higher wagers per activation.

For example, if a player activates an individually activatable bumper ten times in a one minute gaming session (once every six seconds), the gaming system is configured to wager one tenth of the total initial wager on each activation of the associated chance based game. If the RTP of the associated chance based game of this embodiment is 90%, the player is statistically likely to recover 90% of each wager. Though the 90% return is the probable outcome, due to the randomness of the chance based games, this player who makes ten wagers has ten different opportunities to win the jackpot of the chance based game, which is 100 times the effective wager amount, or 10% of the total initial wager.

In another example on the same gaming system with the same chance based game, suppose a player activates the individually activatable bumper only twice in the one minute gaming session; once every thirty seconds. For this example, the gaming system is configured to wager one half of the total initial wager on each activation of the associated chance based game. Therefore, unlike the above example, this less skilled player has a larger stake in each activation of the chance based game, and rather than recovering on average 9% of the total initial wager for each effective wager placed, the player is statistically likely to recover 45% of the total initial wager for each effective wager placed. Similarly, the less skilled player has an opportunity to win the jackpot of 100 times the effective wager amount for each activation of the chance based game. However, the less skilled player only has two different opportunities to win that jackpot award.

It should be appreciated that, although time based gaming as described above generally provides similar payouts and returns for skilled and non-skilled players, the gaming system of one embodiment of the present disclosure is configured to benefit skilled players by including special bonus features which can be skillfully unlocked or difficult-to-trigger individually activatable components which are associated with chance based games with higher RTP values.

It should also be appreciated that a more skilled player can "earn" bonus bumpers with higher RTP values over the course of a plurality of plays of the game. In one embodiment, the gaming system is configured to operate with a suitable player tracking system, as further discussed below, which allows a skilled player to benefit from a strong playing history in subsequent games. For example, in one embodiment, the player tracking system is configured to track past performances and, upon reaching a predetermined point threshold or predetermined number of activations of individually activatable components, the gaming system is configured to award bonus opportunities or additional points to the player.

In one embodiment, each of the individually activatable components is configured to display an image to the player. In one embodiment, the gaming system is configured to color coordinate the individually activatable components based upon a player's progression in the gaming session. For example, in one pinball embodiment, if the player triggers an individually activatable bumper four times, the gaming system changes the color of the bumper to blue. In such an embodiment, when each of the individually activatable bumpers have been changed blue, the player has entered a bonus mode, and each subsequent activation within the bonus mode has an increased value as regards the points earned or the effective wager of the associated chance based game. In one such embodiment, the gaming system is configured to adjust the display on the individually activatable components when the player has achieved a predetermined point threshold, or when the player has entered a bonus session.

In one embodiment, the color or other property associated with the display of each individually activatable component is related to the RTP associated with the chance based game associated with that individually activatable component. For example, if a pinball game includes each of a red, white and blue individually activatable bumper, depending upon certain properties of the bumpers, the red bumper is associated with a chance based game with a RTP of 80%, the white bumper is associated with a chance based game with a RTP of 90%, and the blue bumper is associated with a chance based game with a RTP of 95%. It should be appreciated that in certain embodiments, the level of the RTP associated with the individually activatable bumper is directly related to the difficulty of triggering that individually activatable bumper.

It should be appreciated that, in certain time based gaming embodiments, the time purchased in a gaming session has a discrete value, and is interchangeable with credits awarded to the player. For example, in one embodiment, the gaming system is configured to provide a player with the option of exchanging an amount of credits won for an additional amount of time added onto the gaming session. In another embodiment, the gaming system is configured to penalize a player for various reasons, and such a penalty includes deduction of a certain value of gaming session time which remains.

In another embodiment, the chance based component is configured to provide the player an opportunity to win additional time to be added to the gaming session. For example, in one such embodiment, the if the player activates a chance based component which results in a winning outcome, the player is awarded with an additional amount of time, which extends the gaming session. In one such embodiment, the amount of time added to the gaming session is associated with the odds of receiving the winning outcome. For example, in one embodiment, the player wagered ten credits to play a one minute long gaming session. During the gaming session, the player activated an individually activatable component which is associated with a chance based slot game. Any winning outcome of this particular chance based slot game will be translated to a time extension of the gaming session, and not a direct credit award distribution. After activated, the chance based slot game of this embodiment results in BAR-BAR-BAR, which is associated with a payout of 10 credits per credit wagered. The gaming system is configured to determine how much the effective wager amount was using the time-based gaming wagering process, as described above in detail. In this example, the effective wager amount is one credit because six seconds had elapsed since the immediately preceding triggering condition of an individually activatable component (e.g., six seconds equals one tenth of the one-minute long gaming session, and therefore the effective wager is one tenth of the initial 10 credit wager). After determining the effective amount, the gaming system is configured to translate the associated payout credits into an amount of time. The BAR-BAR-BAR result is associated with a payout of ten credits, which is equal to sixty seconds. In this embodiment, rather than awarding the player ten credits, the gaming system extended the gaming session by sixty seconds.

In various embodiments, the gaming system is configured to deduct the time remaining in the gaming session a predetermined amount for each of a plurality of different types of penalties which are incurred during the gaming session. In one embodiment, the gaming system is configured to penalize a player for 'losing a life' in the case of a role playing game or asteroids game. In another embodiment, the gaming system is configured to penalize a player for allowing the ball in a pinball game to slip between the flippers and into the well at the bottom of the playfield. In one particular pinball embodiment, the gaming system is configured to intentionally delay the launch of the next ball as a penalty to the player for allowing the ball to fall into the well. In another embodiment, the gaming system is configured to penalize a player who crashes his or her car in a racing game. In another embodiment, the gaming system is configured to end a gaming session before the time remaining expires if the player incurs a predetermined number of penalties. In such embodiment in which the player receives a limited number of "lives" or balls, the gaming system is configured to wager the equivalent of the remainder of the time remaining in the gaming session when the final life or final ball has expired.

In one embodiment, the gaming system enables the player to wager a certain amount on each individual chance based game at the beginning of a gaming session. In one such embodiment, the player has the option to buy a discrete amount of time for each of the chance based games which have different RTP values. For example, if in the above illustrated embodiment, the player decided to wager $5 on the RED, WHITE & BLUE chance based slot game because it has the highest AEP, that game would be associated with its own independent clock, which starts at 1 minute, 30 seconds (half of the $10 total wager purchases half of the 3:00 total gaming time). In such an embodiment, the chance based game associated with an independent time meter uses the same time based gaming procedures as described above, however the magnitude of the wager is associated with the time decremented on that game's activatable component. For example, if the RED, WHITE & BLUE game had a 1:30 clock, and it was activated at 1:25 and at 1:20, it is irrelevant to the calculation of the magnitude of the wager of the 1:20 activation that different individually activatable bumpers were activated at 1:22 and 1:23. In such an embodiment, the magnitude of the wager would be calculated using the difference in time from the current activation and the immediately previous activation of that component.

In alternative embodiments, the gaming system is configured to enable the player to wager different portions of the total initial wager on different chance based games, but still only use one clock, similar to the above illustrated embodiment. In such an embodiment, the gaming system is configured to weight the magnitude of each activation of a chance based game based upon the proportion of the total wager designated for that game by the player.

In one embodiment, as described above, the gaming system includes a SPIN METER, which indicates to the player how many chance based game activations have been recorded which have not yet occurred, due to the fast pace and chaotic nature of the triggering of each individually activatable component. In such an embodiment, the gaming system is configured to activate each of the chance based games the appropriate number of times as indicated on the SPIN METER.

In one embodiment, if the gaming session ends prior to the SPIN METER decrementing to zero (i.e., more queued up activations of the chance based games have not yet occurred when time expires), the gaming system is configured to provide the player with an predetermined bonus award for each activation which was in the queue and was not actually activated during the gaming session. In another embodiment, the gaming system is configured to extend the time of the gaming session until each of the outstanding chance based game activations have been activated. In one such embodiment, the player is not enabled to play the skill based game while the remainder of activations are activated. In another embodiment, the gaming system is configured to convert the number of spins remaining in the queue into a multiplier, which is applied to the effective wager of the final spin of a gaming session. For example, if 10 spins remain in the queue when the gaming session expires, the gaming system is configured to apply a 10 times multiplier to the effective wager placed in one final spin.

In one embodiment, each individually activatable component is associated with a different chance based game. In one such an embodiment, each chance based game is associated with only one individually activatable component. In both of these embodiments, each different chance based game is associated with a different paytable and virtual reel map.

In another embodiment, one set of reels in a chance based game is associated with more than one individually activatable component. In such an embodiment, each different individually activatable component associated with that single set of reels in the chance based game has a different award paytable. For example, in one embodiment, a first bumper is associated with a first paytable of a fruit slot game. In this embodiment, a second bumper is associated with a second paytable of the same fruit slot game. It should be appreciated that in various embodiments, harder to activate individually activatable components provide higher returns on a chance based game than easier to activate individually activatable components which provide lower returns on the same chance based game.

In various alternative embodiments, different chance based games are used in conjunction with the skill-based game. In one embodiment, the gaming system uses a chance based poker game, such as five-card stud, five card draw, or Texas Hold 'Em. In another embodiment, the gaming system uses a chance based blackjack game. In traditional poker or blackjack gaming devices, the player must make decisions and input his or her decisions based upon circumstances associated with the play of the game. In these embodiments, the poker or blackjack chance-based games would employ an auto-play strategy, in which a predetermined optimal strategy is used in place of requiring individual player choices.

In one embodiment of a gaming system employing such a chance based game, the player is prompted at the beginning of the gaming session to provide a risk-level strategy for the computer to use. In such an embodiment, the particular chance based game will operate under a different strategy depending upon the risk level chosen by the player. It should be appreciated that the AEP associated with each of the chance based games is at least in part determined by how risky of a strategy the player opts to use (e.g., the more risky the strategy, the lower the AEG, but the higher the payout).

Figure 8A:
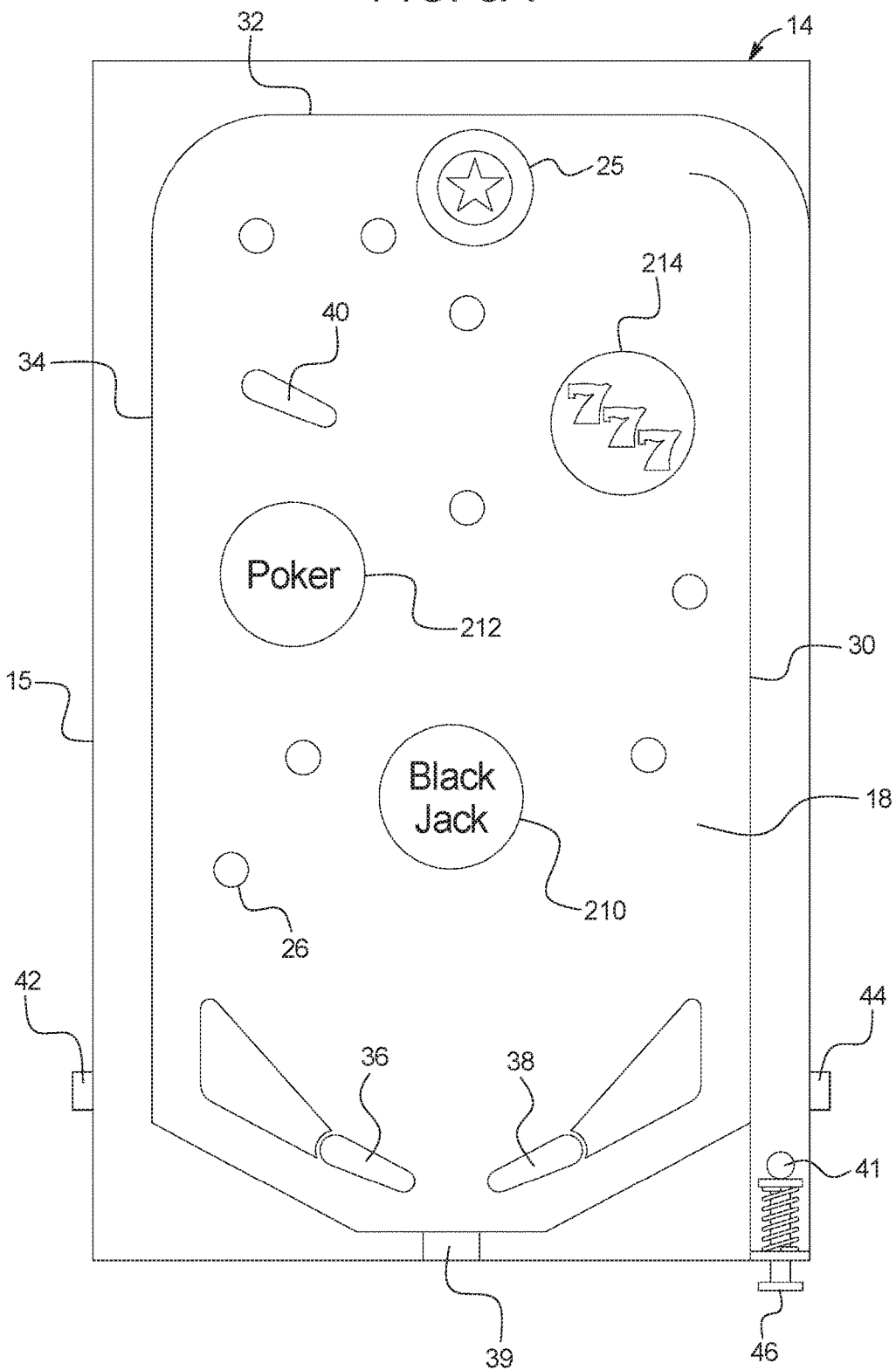
FIG. 8A is a top diagrammatic view of the lower housing of another embodiment of the gaming system disclosed herein including a pinball game used in conjunction with different types of chance based games.

Now referring to FIGS. 8A and 8B, one example embodiment of a pinball game used in conjunction with different types of chance based games is illustrated. In FIG. 8A, the pinball playfield 18 includes three individually activatable components which are associated with chance based games. The bumpers 210, 212, and 214 each display a different symbol which represents the chance based game associated with that individually activatable bumper: bumper 210 is associated with a chance based Blackjack game (as illustrated in FIG. 8B indicated by reference numeral 110); bumper 212 is associated with a chance based poker game (as illustrated in FIG. 8B indicated by reference numeral 112); and bumper 214 is associated with a chance based TRIPLE LUCKY 7's slot game (as illustrated in FIG. 8B indicated by reference numeral 114).

As discussed above, each of the Blackjack game 110 and the poker game 112 are chance based games which require individual player input. The TRIPLE LUCKY 7's slot game 114, however, does not require individual player input or decision making after the game has started. In this embodiment, the player is given an opportunity to choose the risk level associated with the auto-play strategy for the Blackjack game 110 and the poker game 112. As indicated by reference numeral 110a in FIG. 8B, the player has chosen a LOW risk level for the strategy to be automatically employed in the Blackjack game 110. As indicated by reference numeral 112a, the player has chosen a HIGH risk level for the strategy to be automatically employed in the poker game 112. Any plays of the TRIPLE LUCKY 7's game 114 as a result of the activations of individually activatable components will proceed similar to the methods of the slot games described in embodiments above.

When the individually activatable bumper 210 is activated, the Blackjack game 110 is triggered, and the game is played according to traditional blackjack rules. The player's cards are dealt in the display area 110b, and in this embodiment, the player was dealt an ACE and a KING, which results in a winning hand of a blackjack. The dealer's cards are dealt in the display area 110c. The player in this embodiment has a winning hand, and an award is determined by the effective wager amount placed and the type of win which resulted. Similar to the above embodiments, the effective wager placed is dependent upon time-based gaming, and is associated with the amount of time elapsed when the individually activatable bumper 210 is activated. In this embodiment, the player has chosen a LOW risk level 110a, and this results in conservative game play when decisions must be made (i.e., whether the player should "HIT" or "STAY").

When the individually activatable bumper 212 is activated, the poker game 112 is triggered, and the game is played according to traditional five-card draw video poker game rules. When activated, five cards are dealt in the display area 112b. In a typical five-card draw poker game, for each of the five cards, the player then determines whether to hold or discard the cards. In the present embodiment, the gaming device automatically determines for the player which cards to hold or discard based upon a predetermined set of rules or a playing strategy and the risk level chosen by the player. In this case, the player received a JACK and a THREE, due to the HIGH risk level chosen, the gaming device has automatically determined that the remaining three cards should be discarded and replaced by new cards from the deck. After any discarded cards are automatically replaced, the hand is over and it is compared to a paytable to determine whether or not it qualified as a winning hand. The winning amount associated with the winning hand is also determined by the effective wager, which is calculated using time-based gaming methods described above. In this embodiment, the player has chosen a HIGH risk level 112a, which will result in more risky game play when automatic decisions must be made in the game.

It should be appreciated that the present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any chance based games are communicated from the central server to the gaming device in a thick client configuration and computerized instructions for controlling any secondary games or bonus functions are executed by a central server in a thin client configuration.

It should be appreciated that the shape or configuration of the gaming system of the present disclosure may vary. The gaming system may be configured so that a player can operate it while standing or sitting.

In one embodiment, the gaming system preferably includes at least one processor, such as a microprocessor, a microcontroller-based platform, a suitable integrated circuit or one or more application-specific integrated circuits (ASIC's). The processor is in communication with or operable to access or to exchange signals with at least one data storage or memory device. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome. Although skilled players will have more frequent opportunities to earn awards, they are not guaranteed awards based on skill because the outcome of each opportunity is still randomly determined.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In one embodiment, the gaming device includes one or more display devices controlled by the processor. The display devices are preferably connected to or mounted on the cabinet of the gaming device. The embodiment shown in FIG. 1 includes an upper cabinet which displays a game. This display device may display any suitable secondary game associated with the chance based game as well as information relating to the chance based or secondary game.

This display device may also serve as digital glass operable to advertise games or other aspects of the gaming establishment. As seen in FIGS. 3B, 4B, 5B, 6B, 7B, and 8B, in one embodiment, the gaming device includes a wager display 60 and a total award display 68. The wager credit display 60 displays a player's total initial wager or total initial number of credits, cash, or the equivalent. The total award display 68 displays the amount of the player's accumulated awards won over the course of the gaming session. In one embodiment, as described in more detail below, the gaming device includes a player tracking display which displays information regarding a player's play tracking status.

In another embodiment, at least one display device may be a mobile display device, such as a PDA or tablet PC, that enables play of at least a portion of the chance based or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

In one embodiment, the gaming device includes at least one payment device in communication with the processor. The payment device such as a payment acceptor includes a note, ticket or bill acceptor wherein the player inserts paper money, a ticket, or voucher and a coin slot where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

In one embodiment the gaming device includes at least one and preferably a plurality of input devices in communication with the processor. The input devices can include any suitable device which enables the player to produce an input signal which is received by the processor. In one embodiment, after appropriate funding of the gaming device, the input device is a game activation device, such as a play button or a pull arm which is used by the player to start any chance based game or sequence of events in the gaming device. In one embodiment, upon appropriate funding, the gaming device begins the game play automatically. In another embodiment, upon the player engaging one of the play buttons, the gaming device automatically activates game play.

In one embodiment, one input device is a cash out button. The player may push the cash out button and cash out to receive a cash payment or other suitable form of payment corresponding to the number of remaining credits. In one embodiment, when the player cashes out, a payment device, such as a ticket, payment, or note generator prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above, one input device is a touch-screen coupled with a touch-screen controller or some other touch-sensitive display overlay to allow for player interaction with the images on the display. The touch-screen and the touch-screen controller are connected to a video controller. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, the gaming device includes a sound generating device controlled by one or more sounds cards which function in conjunction with the processor. In one embodiment, the sound generating device includes at least one and preferably a plurality of speakers or other sound generating hardware and/or software for generating sounds, such as by playing music for the chance based and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the chance based and/or secondary game as a game image, symbol or indicia.

Gaming device 10 can incorporate any suitable wagering game as the chance based game. The gaming machine or device may include some or all of the features of conventional gaming machines or devices. The chance based game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different secondary wagering games, such as video poker games, video blackjack games, video keno, video bingo or any other suitable chance based game may be implemented.

In one embodiment, a chance based game may be a slot game with one or more paylines. The paylines may be horizontal, vertical, circular, diagonal, angled or any combination thereof. In this embodiment, the gaming device includes at least one and preferably a plurality of reels, such as three to five reels, in either electromechanical form with mechanical rotating reels or video form with simulated reels and movement thereof. In one embodiment, an electromechanical slot machine in the gaming device includes a plurality of adjacent, rotatable reels which may be combined and operably coupled with an electronic display of any suitable type. In another embodiment, if the reels are in video form, one or more of the display devices, as described above, displays the plurality of simulated video reels. Each reel displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the chance based game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, in addition to winning credits or other awards in a chance based game, the gaming device may also give players the opportunity to win credits in a bonus or secondary game or in a bonus or secondary round. The bonus or secondary game enables the player to obtain a prize or payout in addition to the prize or payout, if any, obtained from the chance based game. In general, a bonus or secondary game produces a significantly higher level of player excitement than the chance based game because it provides a greater expectation of winning than the chance based game, and is accompanied with more attractive or unusual features than the chance based game. In one embodiment, the bonus or secondary game may be any type of suitable game, either similar to or completely different from the chance based game.

In one embodiment, the triggering event or qualifying condition may be a selected outcome in the chance based game or a particular arrangement of one or more indicia on a display device in the chance based game. In other embodiments, the triggering event or qualifying condition occurs based on exceeding a certain amount of game play (such as number of games, number of credits, amount of time), or reaching a specified number of points earned during game play.

In another embodiment, the gaming device processor or central controller randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any chance based game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a chance based game.

In one embodiment, the gaming device includes a program which will automatically begin a bonus round after the player has achieved a triggering event or qualifying condition in the chance based game. In another embodiment, after a player has qualified for a bonus game, the player may subsequently enhance his/her bonus game participation through continued play on the chance based game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the chance based game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the chance based game, thus encouraging play of the chance based game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the chance based game to qualify for the secondary game. In this embodiment, the secondary game triggering event must occur and the side-wager (or designated chance based game wager amount) must have been placed to trigger the secondary game.

In one embodiment, one or more of the gaming devices are in communication with each other and/or at least one central controller through a data network or remote communication link. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the chance based game based on probability data. In another embodiment, the central server or controller randomly generates a game outcome for the secondary game based on probability data. In another embodiment, the central server or controller randomly generates a game outcome for both the chance based game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a chance based game outcome, a secondary game outcome, chance based and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a chance based game, a secondary game or both. In another embodiment, the game program may be executable as a secondary game to be played simultaneous with the play of a chance based game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device (s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or chance based game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any chance based game. That is, a player is provided a progressive award without any explanation or alternatively with simple explanations. In another embodiment, a player is provided a progressive award at least partially based on a game triggered or symbol triggered event, such as at least partially based on the play of a chance based game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the chance based game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the chance based games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the chance based game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

One embodiment of the present invention provides a gaming machine or gaming device having a first interactive game requiring one or more player inputs. The player inputs result in one or more outcomes. The outcomes do not result in a monetary or other valuable award provided to the player. Rather, a second wagering game is always provided to the player where the player can obtain or has a chance to obtain a monetary or other valuable award. In one embodiment, the gaming device selects or determines one of a plurality of different functions such as paytables to employ in the wagering game based on the outcome of the first interactive game. The gaming device provides the wagering game to the player and randomly determines an outcome for the wagering game. The outcome in the wagering game can result in a monetary or other valuable award provided to the player based on the selected paytable and the player's wager on the wagering game. The outcome in the wagering game can also or alternatively result in a triggering or an activation of one or more bonus games which provide a monetary or other valuable award to the player. Thus, the present invention contemplates that after a player makes a wager on a wagering game, a first interactive game is played by the player to determine a function of the wagering game where the player may win a monetary award.

In another embodiment, the gaming device includes a plurality of different wagering games. The gaming device determines which of the different wagering games to provide to the player based, at least in part, on the player's outcome of the interactive game. The different wagering games may be of the same type such as different slot games or variations of the same slot game, or maybe of different types such as slot, poker, blackjack, keno, checkers, or bunco. The wagering games may all employ the same paytable or may employ different paytables. Alternatively, one of the wagering games, a plurality of the wagering games, or each wagering game may have multiple different paytables. In one embodiment, the employed paytable may also be based on the outcome in the interactive game.

It should thus be understood that any suitable function of the wagering game can be employed based on the outcomes of the interactive game in accordance with the present invention. For instance, the number of wagering games provided to the player may be based on one or more of the outcomes in the first interactive game. In other embodiments, the gaming device includes one or more of the modifiers such as a multiplier employed in the wagering game or to determine an award in the wagering game. The modifiers may be based on the one or more of the outcomes in the first interactive game. In further embodiments, the number of paylines employed, wager per payline, the number or function of wild symbols or other suitable symbols in the wagering game may be based on one or more of the outcomes in the first interactive game. In another embodiment, the outcome of the first interactive game may make the player eligible to receive a jackpot or a progressive award.

The first interactive game can be any suitable interactive skill game, interactive partial skill game or interactive pseudo skill game. In one embodiment, the skill game may include any suitable type and any suitable number of skill events, such as hand-eye coordination events or dexterity events. For example, the interactive game is any suitable type of racing or competitive game, a sports-based game or a shooting game. In another embodiment, the first interactive game involves mental skill, knowledge, logical deduction or strategy. For example, the first interactive game may be a trivia game or a memory game. The first interactive game is a non-wagering game. That is, a wager is not applied to the first interactive game. The gaming device does not provide an award for the outcome obtained in the first interactive game based on the wager. That is, the player does not have any chance of obtaining any type of award or prize in the interactive game. The first game may alternatively be referred to herein as the interactive game, the interactive skill game, the skill game, the preliminary game, the introductory game, the opening game, the arcade game, the non-wagering game, the non-awarding game, or the functional game.

In one alternative embodiment, the gaming device may additionally provide an achieved token or bonus award to the player based on the outcome in the first interactive game. In one such embodiment, in the first interactive game, the gaming machine provides such award to a designated place finisher, such as the first place finisher. In another such embodiment, the gaming device provides such award to the player if the player achieves a designated level or threshold in the first interactive game such as obtaining the highest score.

In one preferred embodiment of the present invention, the first interactive game is a conventional arcade game. In this embodiment, the gaming device of the present invention includes an arcade game which is physically similar in appearance and function to a conventional arcade game or arcade machine. The gaming device includes additional inputs of a conventional slot or other wagering gaming machine such as player bet or wager inputs, player tracking card input(s), monetary acceptors, and cash out buttons. The gaming device includes additional outputs such as ticket or money dispensers and one or more additional displays for the wagering game or any bonus game associated with the wagering game. Alternatively, the display that displays the arcade-type game may be used to display the wagering game or one or more bonus games associated with the wagering game. It should be appreciated that these gaming machines which include arcade-type interactive games and slot-type wagering games may be placed in any suitable location in a casino or a gaming establishment. One suitable location is adjacent to a sports book area in a casino. Other locations can be in separate gaming rooms dedicated to the gaming machines of the present invention.

In a first embodiment, a player plays the first interactive game against the gaming machine or device to achieve an outcome in the interactive game. In a second embodiment, the gaming machine is part of a gaming system which includes one or more other linked gaming machines. In the second embodiment, in the first interactive game, a player at one gaming machine competes against one or more players at one or more of the other linked gaming machines in the interactive game to achieve an outcome in the interactive game. In these embodiments, the individual outcome for each player in the interactive game can be based on a place or a rank obtained by that player, such as a first place finish or second place finish in the interactive game such as a racing game. In other embodiments, the individual outcome for each player in the interactive game is based on an accumulated number of points obtained by that player, such as a number of targets hit by that player in a shooting game or a number of questions answered correctly by the player in a trivia game. It should thus be appreciated that in the multi-gaming machine embodiment, each participating player will receive an outcome based on that player's performance in the first interactive game which can be but does not have to be in all embodiments relative to the other players' performance in the first interactive game. For example, only one player can obtain first place and one player can obtain last place in one embodiment, but in another embodiment, more than one player can obtain the same outcome such as shooting all of the targets.

It should thus be appreciated in the single gaming machine embodiment, the interactive game outcome is determined based on how the player performs in a skill event in the interactive game wherein the player is playing by himself or herself or playing against the gaming device. In the multi-gaming machine embodiment, the interactive game outcome is determined based on how the player performs in a skill event in the interactive game wherein the player is playing by himself or herself or playing against one or more gaming machines controlled competitors (i.e., a multiple player gaming system where the player is the only competitor) or wherein the player is playing against one or more players or competitors at other linked gaming machines.

In one example embodiment, the interactive game is a racing game in which a player can achieve first place, second place or third place or achieves a rank. In the various embodiments, the player obtains the place or rank by just racing alone in the interactive game to achieve a time, racing against one or more gaming machine controlled competitors, or racing against one or more competitors or players at one or more other linked gaming machines. It should thus be appreciated the outcome of the first player interactive game may be determined in any such suitable manner.

In one embodiment, the gaming device includes a wagering game which includes a plurality of different potential functions or characteristics. The gaming device determines which of the different functions or characteristics will be employed in the wagering game played by a player based on the outcome achieved by that player in the interactive game. In one embodiment, the wagering game is a suitable known chance based wagering game which is operable to provide one or more awards to a player, such as, but not limited to, slot, poker, keno, bingo, craps, blackjack, bunco or any combination thereof. The wagering game may be any suitable wagering-type game developed in the future which is operable upon a wager by a player and which is operable to provide an award to the player. The function or characteristic determined by the interactive game outcome may be any suitable function or characteristic. For example, the gaming device uses the interactive game outcome to determine: (i) the paytable employed in the wagering game; (ii) the volatility of the wagering game; (iii) the average expected payback percentage in the wagering game; (iv) the eligibility for an award, bonus award or a bonus game in the wagering game; (v) the triggering event for one or more bonus games in the wagering game; (vi) the eligibility for a progressive award in the wagering games; (vii) the wager of the wagering game; (viii) the modifier in the wagering game (ix) the type or kind of the wagering game; or (xi) any combination of these.

In another embodiment, as mentioned above, the gaming device or gaming system includes a plurality of wagering games. The gaming device determines which wagering game to provide to the player based on the interactive game outcome. In the single player embodiment, the gaming device provides the player the wagering game associated with the outcome achieved by that player in the interactive game. In the multi-player embodiment, the gaming system provides each player of the interactive game a wagering game associated with the individual outcome achieved by that player in that player's play of the interactive game. It should be appreciated that each of the players may be provided different wagering games. The gaming device provides a player an outcome in the wagering game, which can result in a monetary award. In one alternative embodiment, a player may select which wagering game to play from a plurality of wagering games. In this alternative embodiment, the player's outcome in the interactive game determines which wagering games are available for selection. For instance, the first place winner in the interactive game may have first selection from a plurality of different wagering games. The other players may pick from the remaining wagering games. In another alternative of this embodiment, the interactive game outcome determines the number of choices the player has to select from for the wagering game. For example, the first place winner is provided ten games to select from for the wagering game. The second place winner has eight choices to select from for the wagering game.

The present invention contemplates in one embodiment that each different wagering game will have an equal or substantially equal average expected payback percentage even though the wagering games are different, have different paytables, different volatilities, different size payouts or awards, different numbers of winning combinations, and/or different hit frequencies. This means that the skill event of the interactive game does not determine the outcome in the wagering game because each different wagering game has an equal or substantially equal average expected payback percentage. That is, regardless of the outcome in the skill game, each player has the same overall chances of winning. The present invention may thus provide a perceived advantage to the players who do better in the first interactive game but does not provide an actual advantage on average. In the embodiment, where the volatilities are different, the player who does best in the first interactive game has a chance to receive a higher award.

The present invention may typically take a player longer to play than a game of a conventional slot or other type wagering gaming machine because the player must first play the first interactive game and then play the wagering game. In certain multiple linked gaming device embodiments, players may also wait a limited time, such as a couple of seconds, for other players to join in the next play of the interactive game, as described in more detail below. Casinos or gaming establishments will want to maintain profitability even though the gaming device(s) of the present invention may take longer to play. It should be appreciated that the gaming device and gaming system of the present invention may be funded in multiple ways which account for these possible extended play time periods. In one embodiment, the gaming device requires a higher average minimum bet on the wagering game than a similar conventional gaming machine. In one embodiment, the amount of the money or monetary units required to activate the wagering game of the gaming machine is a set amount, such as $5.00. In another embodiment, the amount of money or monetary units required to activate the wagering game of the gaming machine is a variable amount or in a range, such as $1.00 to $25.00. In one embodiment, when the amount of money required to activate the wagering game of the gaming machine is a variable amount, the amounts of the wager are proportional to the size of the potential payouts or awards.

In another embodiment, the amount wagered also determines an aspect, function or characteristic of either or both of the first interactive game or the second wagering game. For instance, the amount of the wager may determine the length of the first interactive game. A larger wager can result in a longer game play of the first interactive game. The amount wagered can alternatively or additionally determine a function of the wagering game such as a respective portion of the paytable as in conventional gaming machines, the ability to reach a bonus round in the wagering game, or any other suitable feature or function in the wagering game.

It should also be appreciated that in one embodiment, the wagering game for each of the players of the multi-player embodiment may be the same game and have the same game result for each player but that each player may receive a different award based on the same game result. In one embodiment, the interactive game determines a different paytable for the wagering game for different players. For example, the players each play the interactive game and achieve a game result or place in the interactive game which determines their respective paytables. The wagering game, such as a slot game, is the same game for each player. The slot game is initiated on either individual display devices or on one large or common display device. The gaming system generates the same symbols in the slot game for each player. However, the paytables of the players may have different winning combinations or different awards for the same combinations or both. The players have the opportunity of achieving different awards from the same wagering game result.

In one embodiment, the gaming device enables a player to enter a wager for the wagering game in a conventional wagering format. When the player completes the wager for the wagering game, the gaming device then switches to or begins the first interactive game either automatically or upon an input from the player. The gaming device enables the player to play the interactive game and provides and displays the outcome of the interactive game to the player. The gaming device determines the wagering game (including the applicable functions of the wagering game) to provide the player based on the interactive game outcome and displays the wagering game and then the wagering game outcome. If the wagering game outcome is a winning outcome, the gaming device provides an award associated with that winning outcome to the player based in part on the wager and on the paytable of the wagering game.

It should thus be appreciated that the present invention provides a gaming device including an interactive game and a wagering game. In one embodiment, the wagering game is always provided to the player regardless of the outcome of the interactive game. The interactive game does not provide an award to the player and the wagering game can result in an award provided to the player. Thus, the player always has a chance of obtaining an award in the wagering game regardless of the interactive game outcome. In one embodiment, the wagering game has the same or substantially the same expected average payout or return to the player regardless of the interactive game outcome. This allows the inexperienced, average and experienced players to have the same average payout, thus no player is disadvantaged or advantaged by the skill event of the present invention.

One advantage that one embodiment of the present invention provides is that the player may obtain a paytable that has a higher award than other paytables for the wagering game if the player achieves a designated outcome in the interactive game such as first place. The higher award can be a conventional award with a higher value than any of the other awards. The higher award can be a jackpot award, a progressive award, a physical prize such as a new automobile, or any other suitable award. The present invention thus rewards the players which achieve the better outcomes in the first interactive games by providing the player a chance or a better chance to receive a higher or a better award in the wagering game while maintaining that each player will have the same or substantially the same return to player or return from the wagering game and thus from the gaming machine of the present invention.

In another embodiment of the present invention, the gaming system includes multiple linked gaming machines and only a designated number of players, such as one player, the top two players, or the top three players get to play the wagering game. The other players achieve losing outcomes and do not get to play the wagering game. In one embodiment, each player has a probability of being provided the wagering game based on how that player did in the interactive game or based on the outcome in the interactive game. The players who did better in the interactive game have greater chances of playing the wagering game. For example, the first place winner may have a 40% chance of being awarded or playing the wagering game, the second place winner may have a 30% change of being awarded or playing the wagering game, the third place winner may have a 20% chance of being awarded or playing the wagering game, and the fourth place winner may have a 10% chance of being awarded or playing the wagering game. This award system can be configured in any suitable manner. In one such embodiment, consolation awards could be provided to players who are not awarded or do not play the wagering game. This award can be based on the player's wagers made on the wagering games. The random determination of this embodiment can be displayed to the player. For instance, a number from 1 to 10 is drawn. The first place player is assigned the numbers 1 to 4, the second place player is assigned the numbers 5 to 7, the third place player is assigned the numbers 8 to 9 and the fourth place player is assigned the number 10. It should be appreciated that any other suitable methods for determining which player or players play the wagering game may be used by the present invention.

In another embodiment, the gaming system includes a plurality of gaming machines. The gaming machines or gaming system include a first interactive game and a second wagering game. To participate in the games, the players are required to wager a certain amount or level. In one embodiment, portions of the wager are allocated to or fund different pools or paytables. A certain amount or percentage of the wager is allocated for an interactive game pool, a second amount of the wager is allocated for a paytable including the house hold.

More specifically, in one embodiment, a player is required to wager a certain amount, such as $2 to initiate one of the gaming machines of this gaming system. The gaming machine or gaming system allocates a certain amount or certain percentage of the wager for different pools or paytables. In one embodiment, the gaming system allocates 10% of the wager for the interactive game pool, 80% of the wager for the payouts of the paytable and 10% of the wager for the house hold. That is, on average, $0.20 of the wager funds an interactive game pool for the winner of the interactive game, $1.60 of the wager funds the winning outcomes of payouts of the paytable for the wagering game; and $0.20 of the wager funds the house hold, casino or company running the game. In one example of this embodiment, 100% of the interactive game pool is awarded to the winner of that game. This prize pool may be an actual pool or an average expected value pool. Thus, in one embodiment the greater the wager and/or the more players there are per game, the higher the interactive game pool is and in this embodiment, the larger the prize is for the winner.

In one embodiment, a gaming system includes a plurality of gaming machines and a plurality of different interactive game outcomes for an interactive game. The interactive game outcomes include an interactive game designated outcome. A controller is operable with the gaming machines to enable one or more players to each place a wager and fund an interactive game pool with a portion of the placed wagers and enable the players who placed wagers to play an interactive game. The controller is operable with the gaming machines to determine and display interactive game outcomes for the play of the interactive game, wherein the interactive game designated outcome is obtained by one of the players who placed the wagers. The controller is operable with the gaming machines to provide the player who obtained the interactive game designated outcome an interactive game award based on the interactive game pool. For each player who places the wager, the controller is operable with the gaming machines to display at least one wagering game to the player, determine a wagering game outcome for said wagering game, and provide any awards to the player associated with any winning outcomes obtained in said wagering game.

In another embodiment, more than one player receives an award for the interactive game. In one example of this embodiment, if the interactive game pool reaches a threshold amount, more than one player receives an award or prize. For example, if the interactive game pool reaches $75, then the players that finish in first, second and third place each receive an award. In another embodiment, if there are a certain number of players playing the interactive game, more than one player receives an award for the interactive game. For example, if there are more than 20 players playing the interactive game, four of the players receive an award for the interactive game. In another embodiment, if both a certain number of players are playing the interactive game and the interactive game pool reaches a certain level or threshold, the gaming system awards more than one player an award. In another embodiment, the gaming system awards one of the players of the interactive game one or more awards. In another embodiment, the gaming system awards more than one player an award. It should be appreciated that the gaming system may award one or more awards to one or more players of the interactive game in any suitable manner.

In another embodiment, the gaming machine or system requires the player to place a side wager for the interactive game pool. In one embodiment, the gaming system or gaming machine enables the player to place one wager for the interactive game and a separate wager for the wagering game or place a wager and designate a certain amount for the interactive game and a certain amount of the wager for the wagering game. In one embodiment, to play the games, the player is only required to wager on the wagering game. That is, the side wager for the interactive game is optional. In any of these wager allocation embodiments, the gaming system or device may require a minimum bet to qualify to win some or all of the interactive game pool.

In another embodiment, the gaming system or gaming machine provides an award to one or more players of the interactive game based on designated time intervals. In one embodiment, each player of a gaming machine or a player of a data network has a player tracking card or another suitable type a player identifier. If that player has the highest outcome or point accumulation for the interactive game in a designated period of time, the gaming system or device provides that player of the game an award for being the winner for that time interval. For example, every half-hour the gaming system determines which player won the most points for that half-hour and provides the winner a notification on the player card to pick up the award or provides the data network player a message that they won the award and awards the player the funds electronically.

In another embodiment, the gaming system includes a plurality of game rounds and each game round includes an interactive game and a wagering game. In one example of this embodiment, for each round the gaming system provides the interactive game to a player and the wagering game to the player. The gaming machine then provides a next round of the wagering game. In one embodiment, a wager is required for each round of the game. In one embodiment, the player opts-in to the next round of the game by placing an input to continue the game. The input may be to place a wager or insert more money or tokens for the next round. It should be appreciated that this game may also be provided in an opt-out format. That is, the gaming machine continues to the next round unless the player makes an input to quit the game. In one embodiment, in the last round the wagering game has a higher paytable or an increased award than the other rounds. Including an additional feature in the last wagering round of the game encourages players to participate in all rounds of the game.

It is therefore an advantage of the present invention to provide a wagering gaming device that employs skill.

Another advantage of the present invention is to provide a wagering gaming device that combines a first interactive game and a second wagering game where the player's skill in the interactive game does not change the expected average payout in the wagering game.

Another advantage of the present invention is to provide a wagering gaming device that displays a first interactive game and a second wagering game on the same or different displays.

Another advantage of the present invention is to provide a first player interactive game which results in an outcome that determines the wagering game.

Another advantage of the present invention is to provide a first player interactive game which results in an outcome that determines the paytable of a wagering game.

Another advantage of the present invention is to provide a first player interactive game which results in an outcome that determines the volatility of a wagering game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:
a housing;
a plurality of input devices supported by the housing and including a payment device and a cashout button;
a display device supported by the housing;
a processor; and
a memory device storing a plurality of instructions that, when executed by the processor, cause the processor to:
establish a credit balance for a player based at least in part on a monetary value associated with a physical item after the payment device reads the physical item;
enable the player to place a wager associated with a play of a game, the wager deducted from the credit balance;
cause the display device to display a gaming environment comprising a plurality of individually activatable components, the plurality of individually activatable components comprising at least a first individually activatable component and a second different individually activatable component, wherein each of the plurality of individually activatable components are active for the play of the game;
responsive to the first individually activatable component being activated a first designated quantity of times based on one or more player inputs via one of the input devices, the first designated quantity being at least one, cause a display via the display device of a play of a first chance based game that includes a randomly determined outcome, a display of the randomly determined outcome, and a display of any award associated with the randomly determined outcome;
responsive to the second different individually activatable component being activated a second designated quantity of times based on one or more player inputs via one of the input devices, the second designated quantity being at least one, cause a display via the display device of a play of a second different chance based game that includes a randomly determined outcome, a display of the randomly determined outcome, and a display of any award associated with the randomly determined outcome;
wherein the first chance based game and the second different chance based game have one of: (a) a same average expected payback percentage and a same volatility; (b) a same average expected payback percentage and different volatilities; and (c) different average expected payback percentages and a same volatility;

cause the credit balance to be increaseable based on any determined awards associated with the randomly determined outcomes; and initiate a payout associated with the credit balance after an actuation of a cashout button is received.

2. The gaming system of claim 1, wherein the payment device includes a card reader and the physical item includes a card readable by the card reader.

3. The gaming system of claim 2, wherein the card includes a programmed microchip or a coded magnetic strip.

4. The gaming system of claim 1, wherein the payment device includes an acceptor and the physical item is a ticket having the monetary value and readable by the acceptor or currency readable by the acceptor.

5. The gaming system of claim 1, wherein at least one of the player inputs via one of the input devices causes a display of at least one movement of a game object in the displayed gaming environment.

6. A gaming system comprising:
a housing;
a plurality of input devices supported by the housing and including a payment device and a cashout button;
a display device supported by the housing;
a processor; and
a memory device storing a plurality of instructions that, when executed by the processor, cause the processor to:
establish a credit balance for a player based at least in part on a monetary value associated with a physical item after the payment device reads the physical item;
enable the player to place a wager associated with a play of a game, the wager deducted from the credit balance;
cause the display device to display a gaming environment comprising a plurality of individually activatable components, the plurality of individually activatable components comprising at least a first individually activatable component and a second different individually activatable component, wherein each of the plurality of individually activatable components are active for the play of the game;
responsive to the first individually activatable component being activated a first designated quantity of times based on one or more player inputs via one of the input devices, the first designated quantity being at least one, cause an accumulation of a quantity of plays of a first chance based game, each play of the first chance based game including a randomly determined outcome, a display of the randomly determined outcome, and a display of any award associated with the randomly determined outcome;
responsive to the second different individually activatable component being activated a second designated quantity of times based on one or more player inputs via one of the input devices, the second designated quantity being at least one, cause an accumulation of a quantity of plays of a second different chance based game, each play of the second different chance based game including a randomly determined outcome, a display of the randomly determined outcome, and a display of any award associated with the randomly determined outcome;
cause the credit balance to be increaseable based on any determined awards associated with the randomly determined outcomes; and
initiate a payout associated with the credit balance after an actuation of a cashout button is received.

7. The gaming system of claim 6, wherein the payment device includes a card reader and the physical item includes a card readable by the card reader.

8. The gaming system of claim 7, wherein the card includes a programmed microchip or a coded magnetic strip.

9. The gaming system of claim 6, wherein the payment device includes an acceptor and the physical item is a ticket having the monetary value and readable by the acceptor or currency readable by the acceptor.

10. The gaming system of claim 6, wherein at least one of the player inputs via one of the input devices causes a display of at least one movement of a game object in the displayed gaming environment.

11. The gaming system of claim 6, wherein responsive to a first triggering event, the plurality of instructions, when executed by the processor, cause the processor to cause a display via the display device of the accumulated plays of the first chance based game.

12. The gaming system of claim 11, wherein responsive to a second triggering event, the plurality of instructions, when executed by the processor, cause the processor to cause a display via the display device of the accumulated plays of the second chance based game.

13. A gaming system comprising:
a housing;
a plurality of input devices supported by the housing and including a payment device and a cashout button;
a display device supported by the housing;
a processor; and
a memory device storing a plurality of instructions that, when executed by the processor, cause the processor to:
establish a credit balance for a player based at least in part on a monetary value associated with a physical item after the payment device reads the physical item;
enable the player to place a wager associated with a play of a game, the wager deducted from the credit balance;
cause the display device to display a gaming environment comprising a plurality of individually activatable components, the plurality of individually activatable components comprising at least a first individually activatable component and a second different individually activatable component, wherein each of the plurality of individually activatable components are active for the play of the game;
responsive to the first individually activatable component being activated a first designated quantity of times based on one or more player inputs via one of the input devices, the first designated quantity being at least one, cause a display via the display device of a play of a first chance based game that includes a randomly determined outcome, a display of the randomly determined outcome, and a display of any award associated with the randomly determined outcome;
responsive to the second different individually activatable component being activated a second designated quantity of times based on one or more player inputs via one of the input devices, the second designated quantity being at least one, cause a display via the display device of a play of a second different chance based game that includes a randomly determined outcome, a display of the randomly determined outcome, and a display of any award associated with the randomly determined outcome;

wherein one of: (a) the first chance based game requires a player input and the second different chance based game does not require any player input; and (b) the first chance based game requires a player input and the second different chance based game requires a player input;

cause the credit balance to be increasable based on any determined awards associated with the randomly determined outcomes; and initiate a payout associated with the credit balance after an actuation of a cashout button is received.

14. The gaming system of claim 13, wherein the payment device includes a card reader and the physical item includes a card readable by the card reader.

15. The gaming system of claim 14, wherein the card includes a programmed microchip or a coded magnetic strip.

16. The gaming system of claim 13, wherein the payment device includes an acceptor and the physical item is a ticket having the monetary value and readable by the acceptor or currency readable by the acceptor.

17. The gaming system of claim 13, wherein at least one of the player inputs via one of the input devices causes a display of at least one movement of a game object in the displayed gaming environment.

18. The gaming system of claim 13, wherein first chance based game is a draw poker game.

19. The gaming system of claim 18, wherein the second chance based game requires the player input and is a draw poker game.

* * * * *